United States Patent [19]
Osborne

[11] Patent Number: 5,909,546
[45] Date of Patent: Jun. 1, 1999

[54] NETWORK INTERFACE HAVING SUPPORT FOR ALLOWING REMOTE OPERATIONS WITH REPLY THAT BYPASS HOST COMPUTER INTERACTION

[75] Inventor: Randy B. Osborne, Newton, Mass.

[73] Assignee: Mitsubishi Electric Information Technology Center America, Inc. (ITA), Cambridge, Mass.

[21] Appl. No.: 08/614,834

[22] Filed: Mar. 8, 1996

[51] Int. Cl.$^6$ .............................. G06F 13/12; G06F 15/16
[52] U.S. Cl. ............................... 395/200.42; 395/200.46; 395/200.64; 395/200.8
[58] Field of Search ....................... 395/200.07, 200.08, 395/200.09, 200.12, 200.15, 200.2, 200.42, 200.43, 200.46, 200.47, 200.57, 200.58, 200.64, 200.66, 200.67, 200.68, 200.8, 800.25, 800.26, 800.27, 800.28, 200, 800, 827, 840–842, 876

[56] References Cited

U.S. PATENT DOCUMENTS

| | | | |
|---|---|---|---|
| 5,247,626 | 9/1993 | Firoozmand | 395/200.42 |
| 5,299,313 | 3/1994 | Petersen et al. | 395/200.64 |
| 5,560,029 | 9/1996 | Papadopoulos et al. | 395/800.25 |
| 5,682,553 | 10/1997 | Osborne | 395/876 |
| 5,751,951 | 5/1998 | Osborne et al. | 395/200.8 |
| 5,790,804 | 8/1998 | Osborne | 395/200.75 |

*Primary Examiner*—Zarni Maung
*Assistant Examiner*—Bharat Barot
*Attorney, Agent, or Firm*—Dirk Brinkman

[57] ABSTRACT

A network interface for a connection-based communication network has support for remote operations with reply, such as a remote read operation, that bypass host computer interaction. Such a network interface has support for general message processing operations which bypass host processor involvement. Message processing is low level processing of message between the host computer and the network. Such processing is performed on transmission in response to control information provided by the host and is performed on reception in response to control information included in incoming messages. Message processing includes low latency remote read and remote write operations, message filtering, and message demultiplexing. Such a network interface handles incoming messages containing destination control information indicating an operation to be performed, and possibly one or more operands. The network interface processes destination control information from a received message using a message coprocessor or equivalent operational logic. For such a network interface to support message processing, it includes mechanisms for extracting destination control information from a message and for inserting destination control information into a message. The network interface maintains information for each connection that indicates where the destination control information is located in any message received or transmitted over the connection. By providing for a queue of transmit requests between the receive and transmit sides on the network interface, support is provided for remote read operations or other operations invoking a reply which bypass the host processor. The queue can be appended by the receive side in response to a message processing operation performed on a received message. The queue is read by the transmit side to generate an outgoing message as if the queue provided transmit requests like the host computer.

13 Claims, 18 Drawing Sheets

5,909,546

NETWORK INTERFACE HAVING SUPPORT FOR ALLOWING REMOTE OPERATIONS WITH REPLY THAT BYPASS HOST COMPUTER INTERACTION

FIELD OF THE INVENTION

This invention is related to network interfaces, particularly for connection-based networks such as asynchronous transfer mode networks. More particularly, the invention is related to the provision of support for remote operations requiring a reply, such as remote read operations.

BACKGROUND OF THE INVENTION

In most commercial network interfaces, messages between computers are initiated at the operating system or application program level of the sending computer. For example, if a request to read information is received by one computer from another, the first computer processes the request and initiates a reply. It is usually the application program, or operating system, which is imaging the data requested that actually initiates the reply message.

In such systems, a received message requiring a reply requires involvement of the host computer operating system, at a minimum, to process the received message to determine what data should be sent in the reply, and to generate an appropriate transmit request to be processed by the network interface. These operations involve a substantial amount of overhead on the host computer.

SUMMARY OF THE INVENTION

This overhead in generating replies to received messages may be overcome by the present invention which provides for a network interface having message processing capability and a reply queue. The reply queue is used to maintain transmit requests generated by the network interface as the result of message processing. These transmit requests may mimic transmit requests generated by the host computer. The network interface periodically polls the transmit requests from both the computer and the reply queue to generate reply messages.

Accordingly, one aspect of the invention is a network interface having support for performing remote read operations, for connecting a host computer to a network of a plurality of computers. This network interface has a receive side for processing incoming messages and for identifying an incoming message from one of the plurality of computers requesting a remote read operation. A remote read queue stores an entry indicating a connection and a location of data in the host computer to be transmitted to the one of the plurality of computers requesting the remote read operation. A transmit side processes outgoing messages and reads the entry from the remote read queue. The transmit side includes a mechanism for accessing the location in the host computer to retrieve data and a mechanism for generating header information using the connection to generate a reply message to the one of the plurally of computers. Either or both of the transmit side and the receive side may be implemented to support other message processing operations as in other aspects of the invention.

BRIEF DESCRIPTION OF THE DRAWINGS

These and other features of the Subject Invention will be understood better in view of the following Detailed Description taken in conjunction with the Drawings in which.

DETAILED DESCRIPTION

Figure 1A:
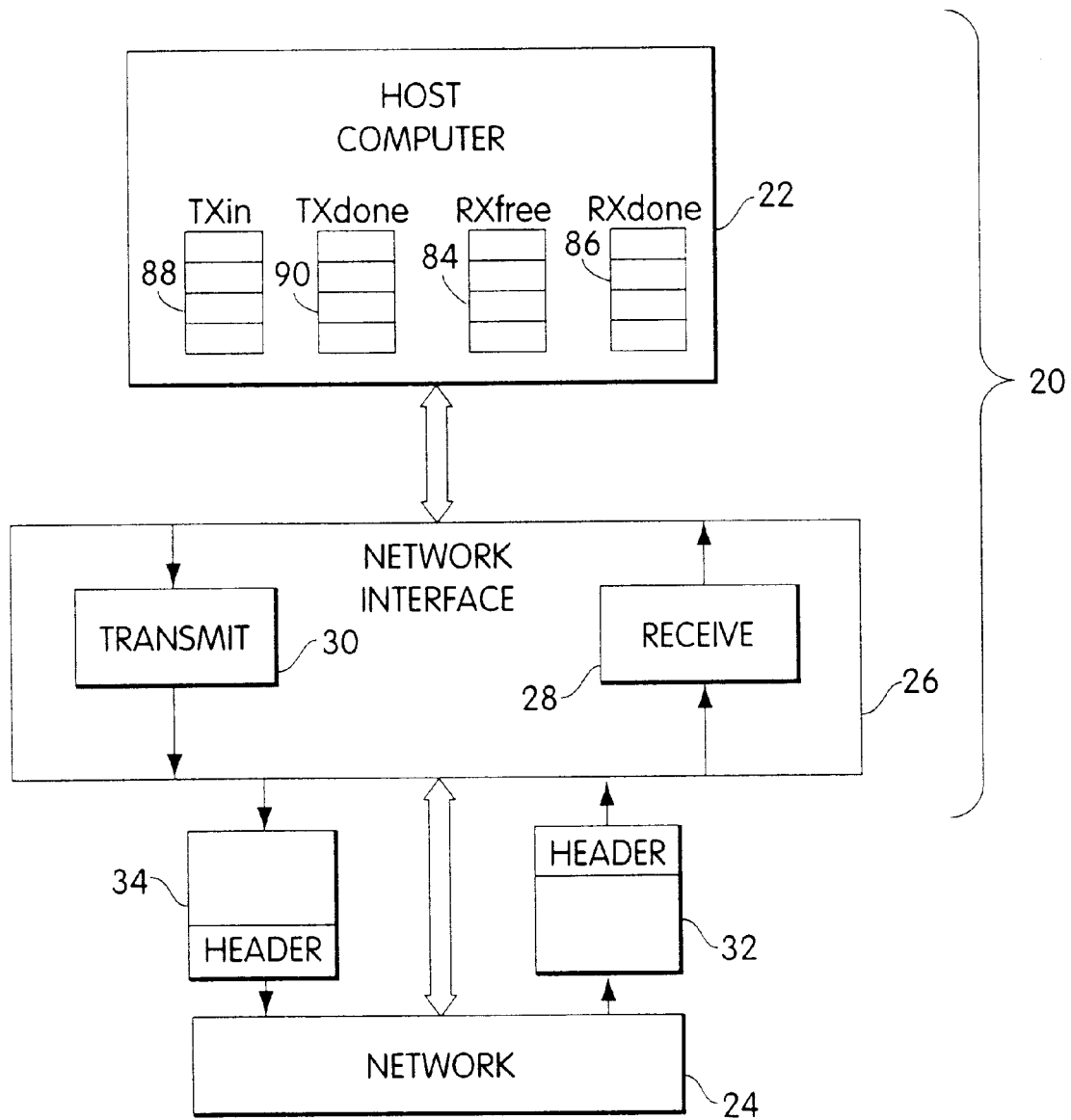
FIG. 1A is a block diagram of a typical computer system with a network interface.

Referring now to FIG. 1A, a typical computer system 20 includes a host computer 22 connected to a network 24 via a network interface 26. The network interface 26 includes a receive side 28 and a transmit side 30 which handle, respectively, transmission and receipt of messages 32, 34. State-of-the art implementations of such systems generally work as follows.

To assist in transmitting and receiving messages, the host computer 22 maintains four queues, two for each of the transmit and receive sides of communication. On the transmit side, a transmit queue 88 (TXin) is a list of messages to be sent to other computers. Each entry in the list is called a frame descriptor and typically indicates the connection or virtual channel on which the message will be sent and an indication of the location of the message data in the host memory. The transmission-complete queue (TXdone) 90 is a listing of similar entries into which entries from the TXin queue are placed after transmission of the corresponding messages is completed. On the receive side 28, a free buffer queue (RXfree) 84 is a list of free buffers in the host that are available for receiving data. The used buffer list (RXdone) 86 indicates those buffers which have most recently been used to store data from received messages.

To transmit messages 34 from the host computer 22 to the network 24, the network interface 26 reads an entry from the TXin queue 88 to obtain the location in host memory of the data to be sent and the destination of the message. The network interface 26 copies appropriate size chunks of the data from the host memory to the network interface and forms the chunks of data into a packet for transmission into the network. In state of the art systems, such copying is typically performed by direct memory access (DMA).

To receive messages 32 from the network, the host computer identifies in advance locations or free buffers in host memory available for storing arriving messages. The list of currently available free buffers is found in RXfree queue 84. When a packet arrives at the network interface, the network interface selects a free buffer from the RXfree queue 84 and copies the message data into that free buffer in host memory. Additional free buffers are used as necessary. At the end of the message, the network interface notifies the host computer, such as via interrupt. In state-of-the-art systems, the copying of data from the network interface to a free buffer in host memory is performed via direct memory access (DMA), an efficient block transfer initiated by the network interface.

In a system such as shown in FIG. 1A, the process of receiving and transmitting messages involves computer processing overhead which is chiefly due to operating system interaction and message copying. Operating system interaction typically occurs because application programs on the host computer do not interact directly with the network interface, but rather indirectly via the host operating system. This interaction has four facets. First is handling notification, typically via an interrupt when messages arrive and/or when the number of messages in RXdone exceeds a given threshold. Second is application initiated transfer of data either to TXin, to send a message, or from RXdone in response to notification from the network interface. Third is the translation of virtual memory addresses used by the application program into physical addresses used by the network interface to access host memory directly. In a state of the art system, on the transmit side this interaction occurs when the operating system informs the network interface of the data to be sent. On the receive side, this same overhead occurs when the operating system informs the network interface of the location, or free buffer, in which a received message should be placed. Fourth is general housekeeping functions, such as keeping RXfree full, that are not in a critical path. Operation system calls and handling interrupts are typically expensive. Such operating system interaction both consumes host processing cycles, reducing the number of cycles available to application programs, and adds a delay in sending and reeving messages.

Message copying overhead generally occurs because the buffer(s) used by the operating system in which a received message is stored, is chosen from a global pool of available free buffers in the operating system, such that there is no fixed assignment of free buffers to connections. As a result, the location of the free buffer is not guaranteed to be the final location in the host memory in which the message data is desired by the application program. Therefore, the operating system copies the data from the free buffer to the desired final location. Thus, message copying also consumes host processing cycles, reducing the number of cycles available to application programs, and adds a delay in receiving messages.

Figure 1B:
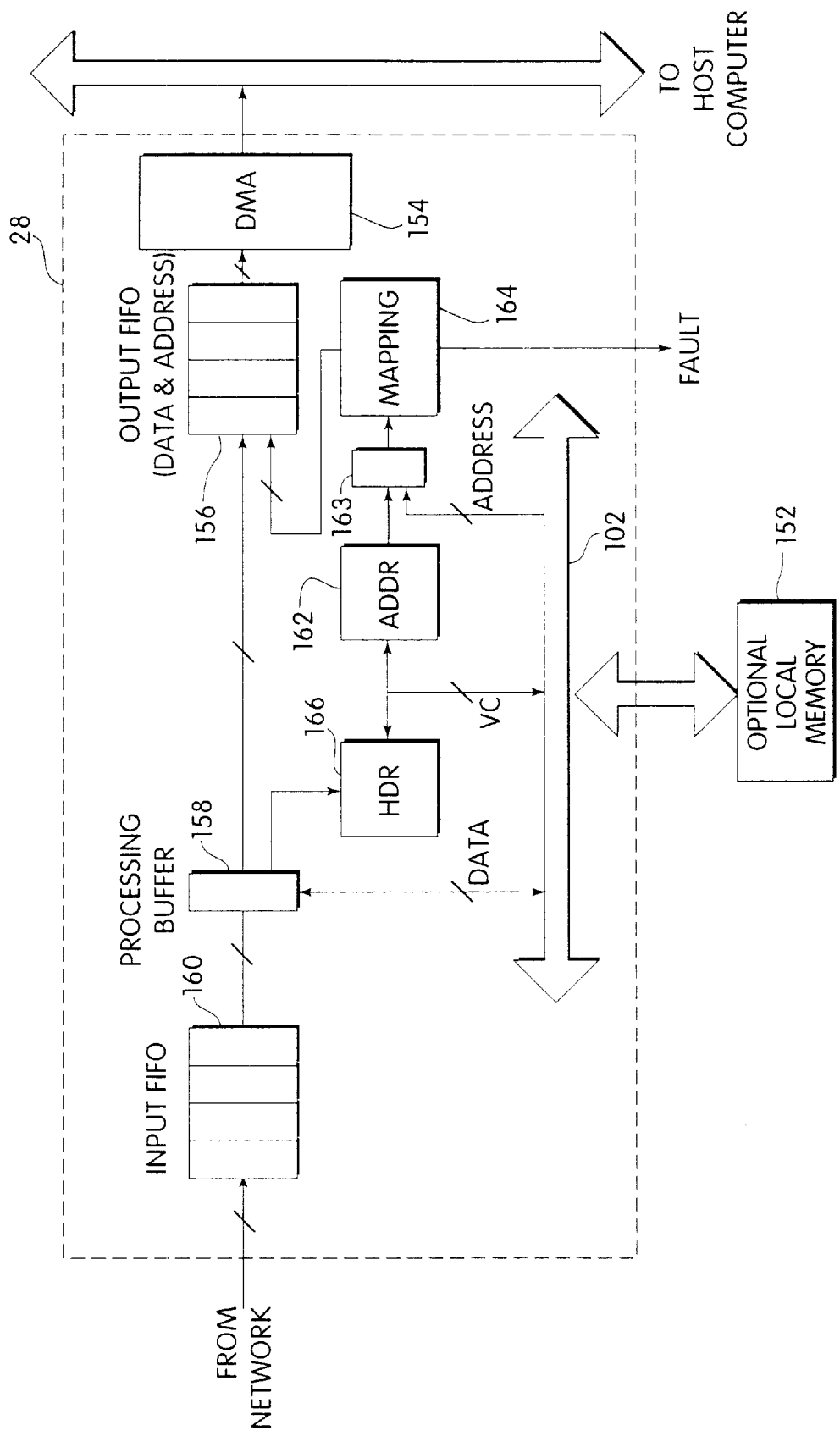
FIG. 1B is a block diagram of a receive side of a network interface which includes a mechanism for mapping virtual addresses.
Figure 1C:
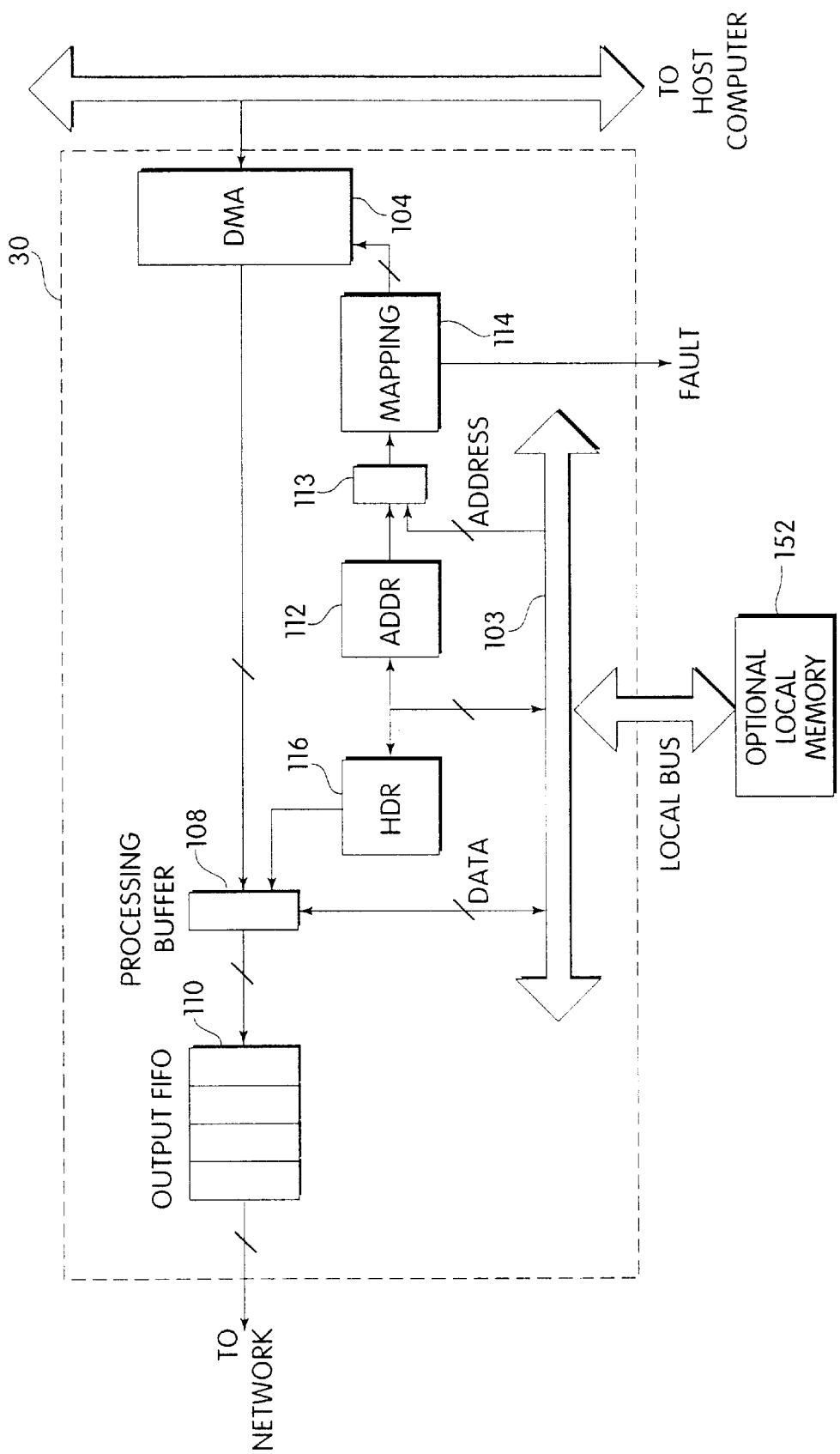
FIG. 1C is a block diagram of a transmit side of a network interface which includes a mechanism for mapping virtual addresses.

Operating system interaction is reduced by using a network interface that permits an application to access directly the network interface. However, to ensure appropriate protection, there is a mechanism which translates virtual addresses used by the application program into physical addresses used by the network interface to access host memory, such as shown in FIGS. 1B and 1C. Such a network interface is disclosed, for example, in "Experiences with a High-Speed Network Adaptor: A Software Perspective," by Peter Druschel et al., published in the *Proceedings of ACM SigComm '94*, September 1994. In such a system, the operating system does not need to perform the translation, but provides the network interface with a virtual address. Through operating system interaction is reduced, the operating system still processes arrival notification.

On the receive side 28 as shown in FIG. 1B, packets are received by an input buffer 160, typically a first-in, first-out memory (FIFO). A processing buffer 158, which may be the first memory location in the input FIFO 160, is connected to both a header processing circuit 166 and an output buffer 156. The output buffer is typically a first-in, first-out memory (FIFO). The header processing circuit strips header information from an incoming packet to determine, among other things, the virtual channel to which the packet is directed. This virtual channel information is used to obtain a virtual address from an optional local memory 152 and address generation circuit 162. An address is provided via multiplexor 163 to mapping circuit 164 which maps the virtual address to a physical address. The data to be written, from processing buffer 158, and the physical address from mapping circuit 164 are input to the output buffer 156. A DMA section 164 processes data in the output buffer 156 to place the data directly in the corresponding location in host memory.

On the transmit side 30, as shown in FIG. 1C, a virtual address is received via local bus 103, for example from a controller (not shown) in the network interface or by generation by the address generation circuit 112 via selector 113. The virtual address is provided to a mapping circuit 114 which determines a physical address used by a DMA circuit 104 to access host memory and copy data into a processing buffer 108. A header processing circuit 116 provides header information to processing buffer 108. The generated packet is then provided to an output FIFO 110 for transmission to the network.

Message copying overhead can be reduced by providing a mechanism which copies data directly from the network interface to the application program address space, bypassing the host processor. Such a system is disclosed in U.S.

patent application Ser. No. 08/226,541 by Randy B. Osborne, filed Apr. 12, 1994. In such a system, messages communicated in the network include an area of destination control information, which identifies an operation to be performed by the network interface and possibly some operands to be used in performing the operation. The format of such destination control information is described in more detail below in connection with FIGS. 2B–2E. A mechanism in the network interface examines a received message and performs the operation indicated by the destination control information without interaction with the host processor. For example, data in a message may be deposited directly into host memory at a location determined by the network interface to eliminate copying by the host computer.

Figure 2A:
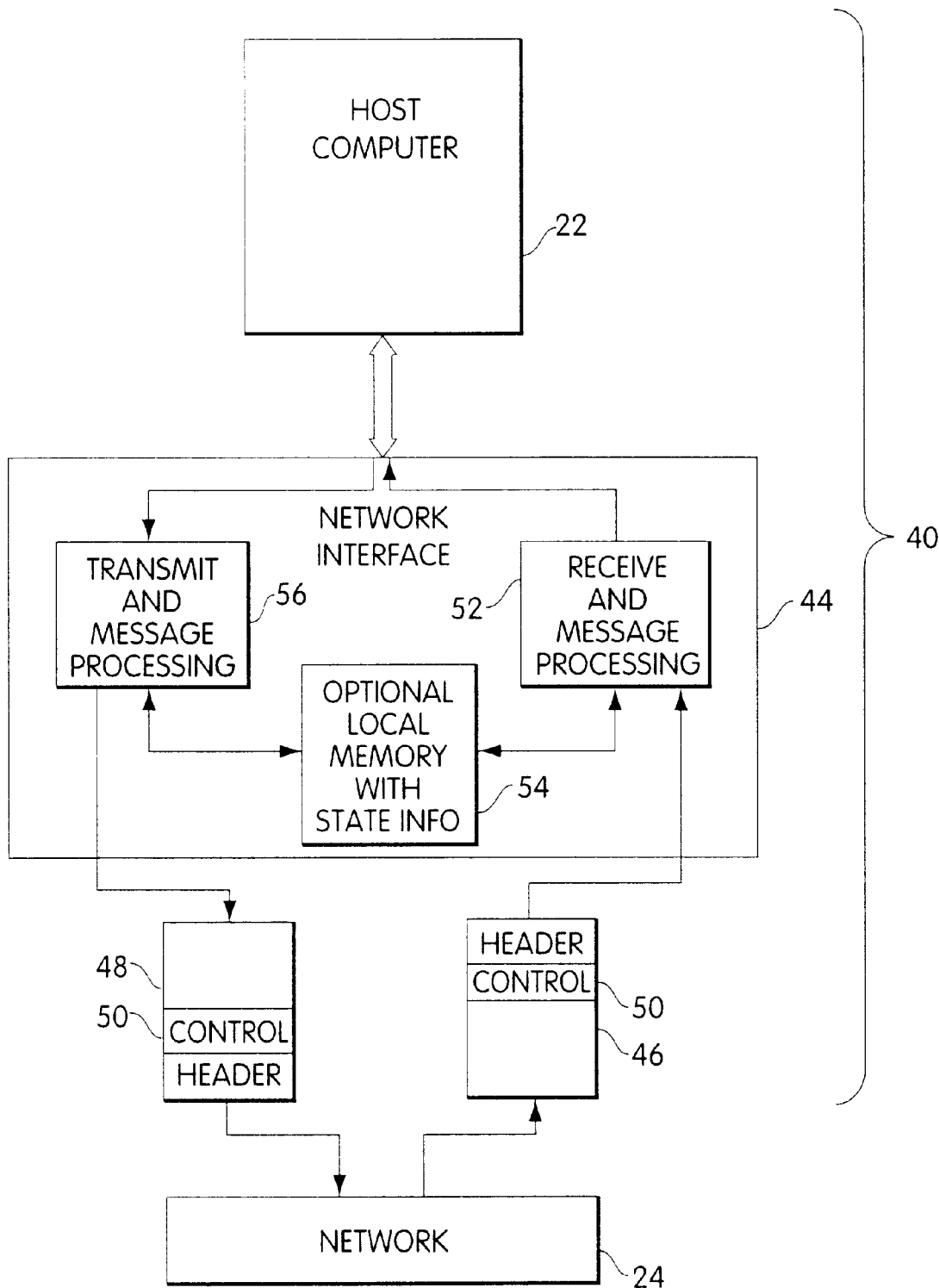
FIG. 2A is a block diagram of a computer system with a host computer and network interface for use in low latency and low overhead communications.
Figure 2B:
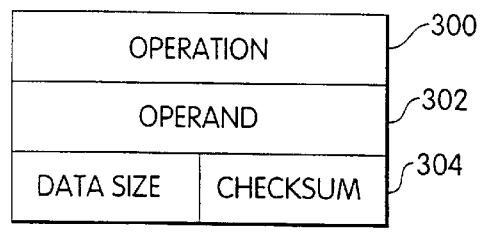
FIG. 2B illustrates data content of a simple form of destination control information.

FIG. 2A shows such a computer system 40 which includes a mechanism for reducing message copying overhead. In FIG. 2A, the computer system includes a computer 22 connected to a network 24 via a network interface 44. In this system, the messages 46 and 48 include destination control information 50 provided by the sender. The receiving network interface processes the destination control information 50 to reduce the communication delay (latency) and the impact of the communication on the receiving host computer 22. In particular, the receive side processing 52 uses the destination control information to access state information in the local memory 54 of the network interface. This state information is processed to obtain addresses of specific locations in host memory (not shown) in which data is deposited directly, rather than the location of a next free buffer in RXfeee. Similarly, the transmit side 56 reads data directly from the host computer memory (not shown) and appends destination control information obtained using state information from local memory 54 to generate the transmitted message 48.

Figure 2C:
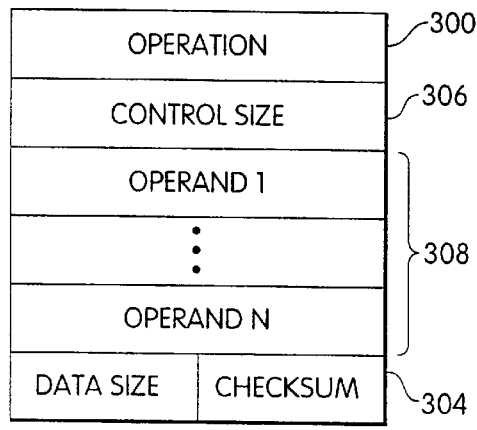
FIG. 2C illustrates data content of a more complex form of destination control information indicating the size of the destination control information.

FIGS. 2B to 2E are schematic diagrams representing the data content of destination control information 50. The simplest kind of destination control information, shown in FIG. 2B, includes an indication 300 of an operation to be performed at the destination, and an indication 302 of an operand used in the operation. The operand may be a reference to information stored in the network interface of the destination or information provided by the source, or both. Data size and checksum information is also provided as indicated at 304. A more complex organization of the destination control information 50, includes an indication 306 (either implicit or explicit, as shown in FIG. 2C, of the size of the destination control information. This format allows for a variable number of operands 308 to be provided.

Figure 2D:
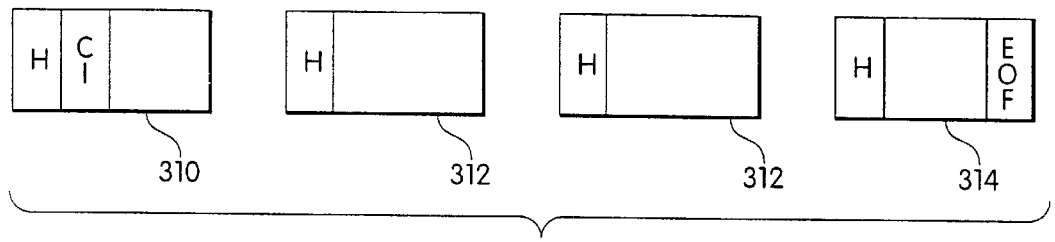
FIG. 2D illustrates a message of a plurality of ATM cells containing destination control information.
Figure 2E:
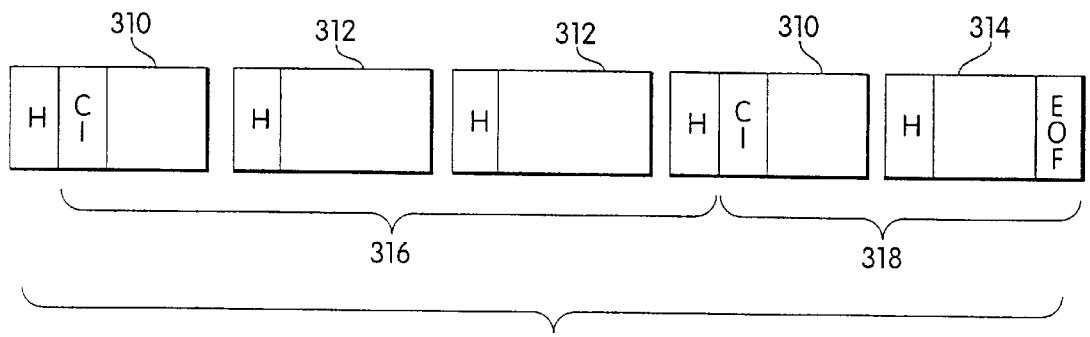
FIG. 2E illustrates a message comprised of a number of control segments.

Such destination control information 50 is generally inserted at the beginning of a message. A message may be comprised of a number of cells if ATM, such as shown in FIG. 2D, in which case, the first cell 310 generally contains the destination control information and remaining cell 312 and a last cell 314 carry data. However, it is also possible to have a message comprised of a number of control segments, as indicated at 316 and 318 as indicated in FIG. 2E. Such a message is called a segmented message. In such a case, each control segment has destination control information 50 inserted at the beginning of the first cell 308 of each control segment.

The present invention overcomes the complexity of and reduces latency in connection with generating reply messages corresponding to remote operations by providing a queue in the network interface into which transmit request can be placed by receive side processing.

One embodiment of the present invention also reduces complexity of message processing support in a network interface by providing a simple interface to an arbitrary message coprocessor. Destination control information 50 is processed to perform any of an arbitrary set of message processing operations, defined according to the implementation of the message coprocessor. The use of a simple interface to an optional message coprocessor allows a network interface with support for low-level message processing to be manufactured economically. Such a system also allows for experimentation and flexibility in various kinds of message processing operations and their applications, not solely for low latency. Although the following description relates to a specific embodiment of message processing, it should be understood that other forms of the support for message processing allows use of the present invention.

Figure 3:
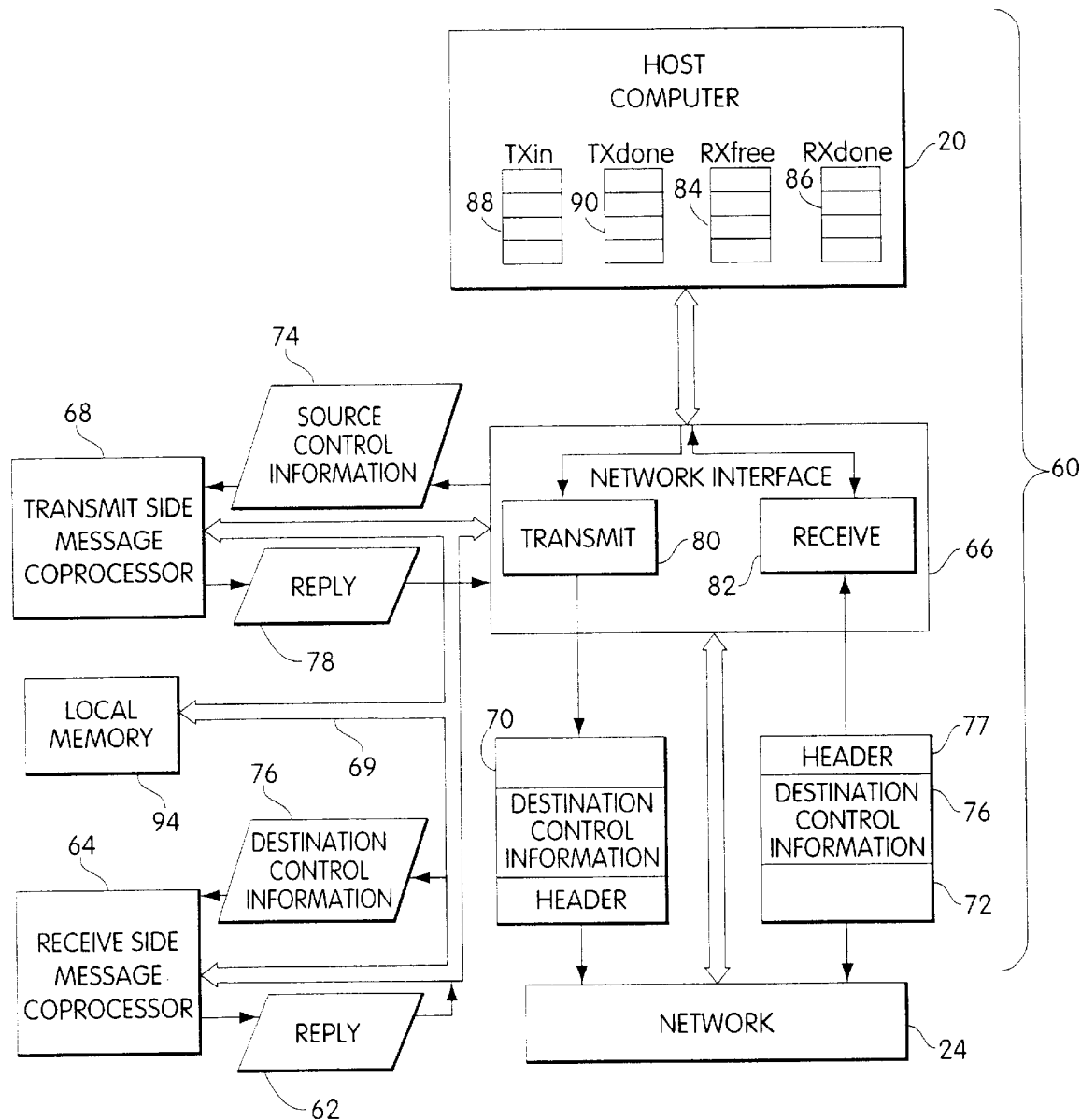
FIG. 3 is a block diagram of a computer system with network interface and message coprocessor in accordance with this invention.

Referring now to FIG. 3, in the invention, a computer system 60 includes a host computer 20 connected to a network 24 via a network interface 66. The network interface may be implemented as an integrated circuit using VLSI or LSI technology. The network 24 connects this computer system 20 to other computer systems (not shown) which are connected to the network in a similar manner. In one embodiment of the invention, the network is a connection-based network such as an asynchronous transfer mode (ATM) network. To support communication processing, the host computer may have ring queues 84, 86, 88 and 90 as in prior systems. In such an embodiment, however, an entry in the transmit side queues 88, 90 may include source control information, described below and which, indicates how destination control information is to be obtained.

In the subject invention, the network interface operates as a standard network interface when messages 70, 72 are transmitted or received without any destination control information 76. When a message is to be transmitted or received with destination control information 76, the network interface handles any required processing through optional message coprocessors 68 and 64. Accordingly, the network interface has an interface over a local bus 69 through which it connects to a message coprocessor 68 for transmit side processing and to a message coprocessor 64 for receive side processing.

On the transmit side to the network interface sends source control information 74 from the host computer 20 to the transmit side message coprocessor 68, through this interface, which the transmit message coprocessor 68 processes. The source control information indicates to the message coprocessor 68 how to obtain destination control information 76 to be inserted in an outgoing message. A reply 78 indicating a command is returned by the transmit side message coprocessor 68 to the network interface 66. This command indicates how to obtain destination control information 76 to be inserted in the outgoing message.

On the receive side, when a received message includes some destination control information for use in message processing, as indicated at 76, the destination control information is transmitted to a receive side message coprocessor 64 as indicated at 96. The receive side message coprocessor 64 in turn provides a reply 62 to the network interface, which indicates one of a small set of commands indicating the operation to be performed by the network interface 66 on the message.

The simple interface for communicating source control information 74 to the transmit side message coprocessor 68 and for communicating replies 78 from the transmit side message coprocessor 68 to the network interface 66, provides a form of application programing interface between the network interface and the transmit side message coprocessor 68. Similarly, the simple interface for communicating destination control information 76 to the receive side message coprocessor 64, and for communicating replies 62 from the receive side message coprocessor 64 to the network interface 66, provides a form of application programming interface between the network interface and the receive side message coprocessor 64.

The transmit and receive side message coprocessors can be programmed to perform an arbitrary set of message processing functions limited only by the capabilities of the particular message coprocessor involved and the syntax provided for the corresponding control information it processes. Any user can define the syntax of the control information in the operations to be performed by the message coprocessors so long as the message coprocessors always returns a reply indicating one of the small set of commands implemented on the network interface 66. The transmit and receive side message coprocessors need not be separate physical entities as implied by FIG. 3. They may be multiplexed by one physical entity.

In one embodiment of the invention, the network interface is also connected to a local memory 94 over local bus 69. This local memory, for example, may contain tables which are used to maintain state information about the virtual channels currently in use. In this embodiment, whether a received or transmitted message includes destination control information 76 is determined by the connection or virtual channel on which the message is communicated. A "specially-marked" virtual channel, which may be so marked by using a table entry in the local memory 94, can be deemed to have destination control information 76, whereas messages on other connections or virtual channels can be deemed not to have such destination control information 76.

Implementation of such a network interface with support for message processing and an interface to message coprocessors will be described now in more detail in connection with FIGS. 4–12. The receive side message processing support will first be described in more detail in connection with FIGS. 4 and 6A–6B.

Figure 4:
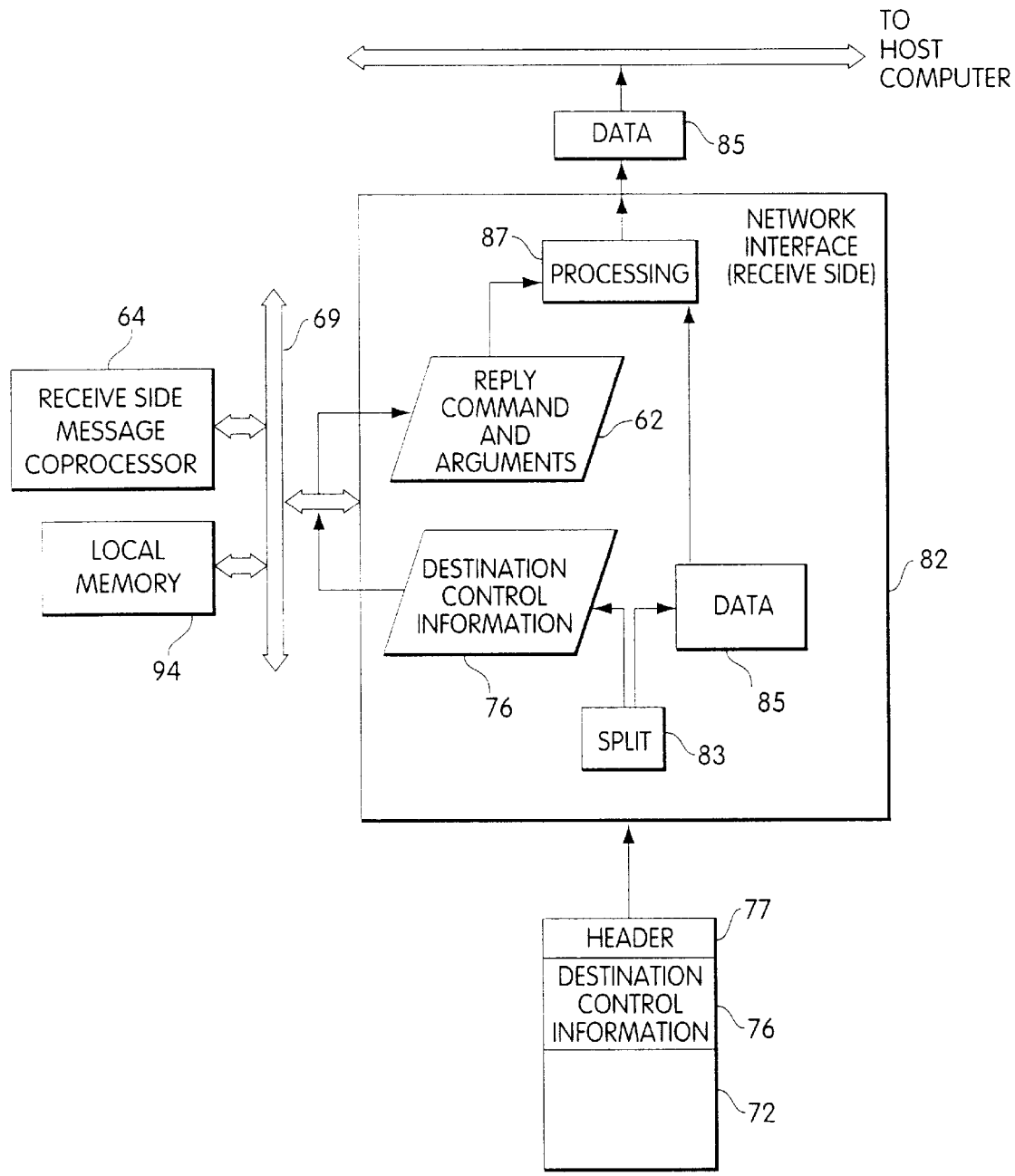
FIG. 4 is a schematic diagram of data flow in a receive side of a network interface with message processing support in accordance with this invention.

Referring now to FIG. 4, the receive side 82 of the network interface is connected to a local bus 69 to which the optional receive side message coprocessor 64 and an optional local memory 94 are connected. The receive side 82 of the network interface generally operates as follows. Messages with destination control information 76 are received and their content is split at 83 into destination control information 76 and data 85. The header 77 is processed to obtain virtual channel (VC) data and other state information. The virtual channel, state and destination control information are provided to the local bus 69 from which they are received by the receive side message coprocessor 64. After completion of processing of the message coprocessor 64, a reply command and arguments 62 are returned by the message processor to the network interface over local bus 69. The network interface has a controller 87 which uses the reply 62 to process the data 85 as so indicated, such as storing the data 85 to a specified location in host memory.

Figure 5:
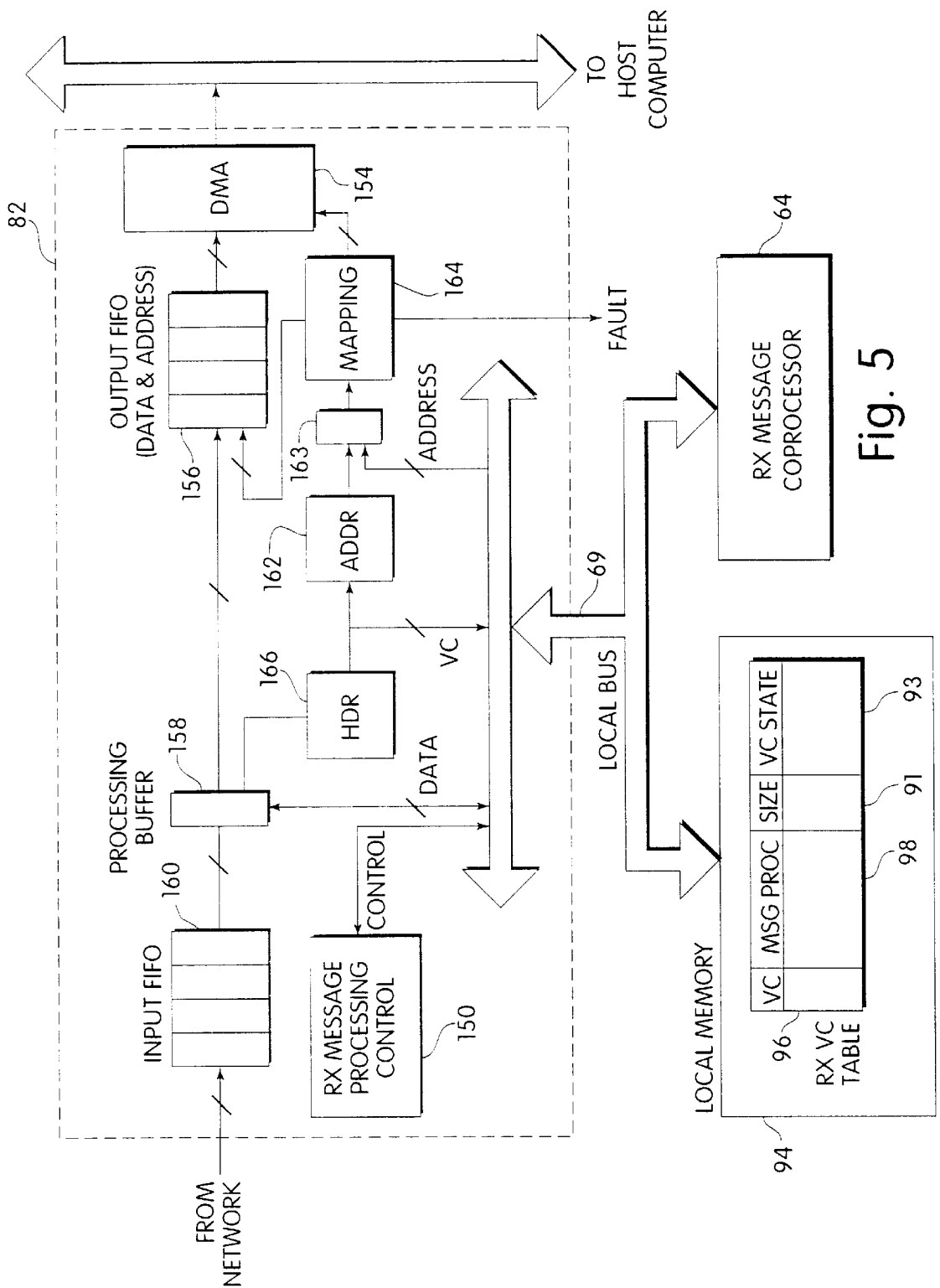
FIG. 5 is a block diagram of a receive side of a network interface with message processing support in accordance with this invention.

FIG. 5 is a more detailed block diagram of elements of the network interface which are relevant to receive side processing. In FIG. 5, the local memory includes a receive side virtual channel table 96 known as a RX VC table. For each entry in the RX VC table, an indication 98 of whether this virtual channel supports message processing operations is provided, and if so, an indication 91 of the initial destination control information size. The table also may contain, per VC other state information such as the physical addresses in which to store remaining cells in the same control segment of a message as indicated 93. The local memory 94, along with a receive side message coprocessor 64, is connected to a receive side (RX) message processing controller 150 via local bus 69. The RX message processing controller 150 uses the RX VC table to determine whether message processing steps are to be taken on an incoming message, and also controls communication with the message coprocessor to cause any such operations to be performed.

Messages are received from the network by an input FIFO 160, which are then transmitted to a processing buffer 158, typically the first memory location of input FIFO 160. The processing buffer 158 holds each cell for processing by the network interface. Destination control information and headers are read from the processing buffer 158. A header processing circuit 166 is provided to read header information from the message to determine the VC information and provide it to a message processing controller 150, which, using information in the RX VC table 96, determines whether message processing operations are to be performed. Processing of the message continues as in a typical network interface if such message processing is not performed. In this respect, the receive side of the network interface may include an address generation circuit 162, multiplexer 163, mapping circuit 164, output FIFO 156 and DMA circuit 154 as discussed above in connection with FIG. 1B.

The general operation of the receive side 82 of the network interface to perform message processing operations will now be described. The receive side 82 of the network interface has the general task of extracting the destination control information 76 from an incoming message 72 to provide it to the receive side message coprocessor 64. If after the steps described above, the network interface finds that the virtual channel is specially marked and thus message processing is to be performed, the network interface then determines the size of the destination control information 76 using the RX VC table 96. The message processing controller then accesses this destination control information in the processing buffer 158 and sends it to the receive side message coprocessor 64. The message coprocessor interprets this data as destination control information and performs an appropriate action. The action can be arbitrary and is up to the programmer of the message coprocessor. The network interface then reads back a reply 62 from the message coprocessor 64.

The interface between the network interface and the message coprocessor 68 in one embodiment of the receive side will now be described. On the receive side 82, the network interface communications with the message coprocessor via two memory-mapped regions over the local bus 69. The number of regions used may vary with the implementation; however the interface generally requires at least two regions. The first region, called the destination control region, is used to write destination control information from the received message to the message coprocessor. This region may also include a region, called the start region, which is used to provide a start signal to the message processor to indicate that it should start processing the destination control information written into the destination control region. A second region, called the reply region, stores replies from the message processor to the network interface. The network interface reads a reply from this region at an appropriate time. The reply region may be subdivided into two or more regions to communicate a command and arguments, such as an address for accessing the host memory, an address in local memory, an address in the message coprocessor, or other argument.

In operation, the network interface writes the appropriate data, i.e., the destination control information from the received message, to the destination control region then writes an instruction to the start region. The message coprocessor processes the destination control information which results in one of a small set of commands being written into the reply region and perhaps one or more arguments.

The receive side of the network interface has a small set of commands which it recognizes from the message coprocessor to simply the interface. These commands correspond to simple operations to be performed by the network interface, such as the following:

1. discard the message (for message filtering);
2. restore the control information to the front of the message;
3. store a specified amount of the remaining message in a free buffer;
4. stores a specified amount of the remaining message at the address specified by the message coprocessor;
5. send more data from the message to the message coprocessor and read back another command;
6. initiate a reply, such as for remote read operations; and
7. initiate an interrupt to the host computer.

It should be understood that this list of commands is merely exemplary and is not limiting.

The reply region structure is generally a number of bytes of data, in which one portion indicates a command and one or more additional portions represent arguments. For example, one byte of data may represent a command. A second byte may represent an argument. Additional bytes may also be used for additional arguments. The command simply indicates which of the small number of commands to perform.

A specific format of the destination control region and the reply region in one embodiment is described in Appendix A. The command structure shown in Appendix A provides great flexibility for processing received messages. The control information size can vary per message by sending a fixed amount of destination control information to the coprocessor, which then can request that more control information be sent. The number of control segments can also vary. The coprocessor can indicate that another control segment follows immediately after. Explicit scatter DMA maps to one control segment per address-data pair. Implicit scatter DMA is supported by changing buffers in the middle of a message: a specified amount of data can be sent to one buffer, either externally supplied or from RXfree, and then the remaining data can be sent to one or more additional buffers. This flexibility could be used in the TCP/IP processing to send the header to one buffer and the data to another buffer. In this case, the network interface writes zero data from the message to the coprocessor. The coprocessor just returns a command indicating to change the buffer after storing an amount of data equal to the TCP/IP header size.

With this interface the message coprocessor does almost all of the processing of the message and the operations which can be performed are programmable and entirely up to the user. The network interface merely pops message data from the data stack and reads back information which are interpreted as a small set of simple commands.

Figure 6A:
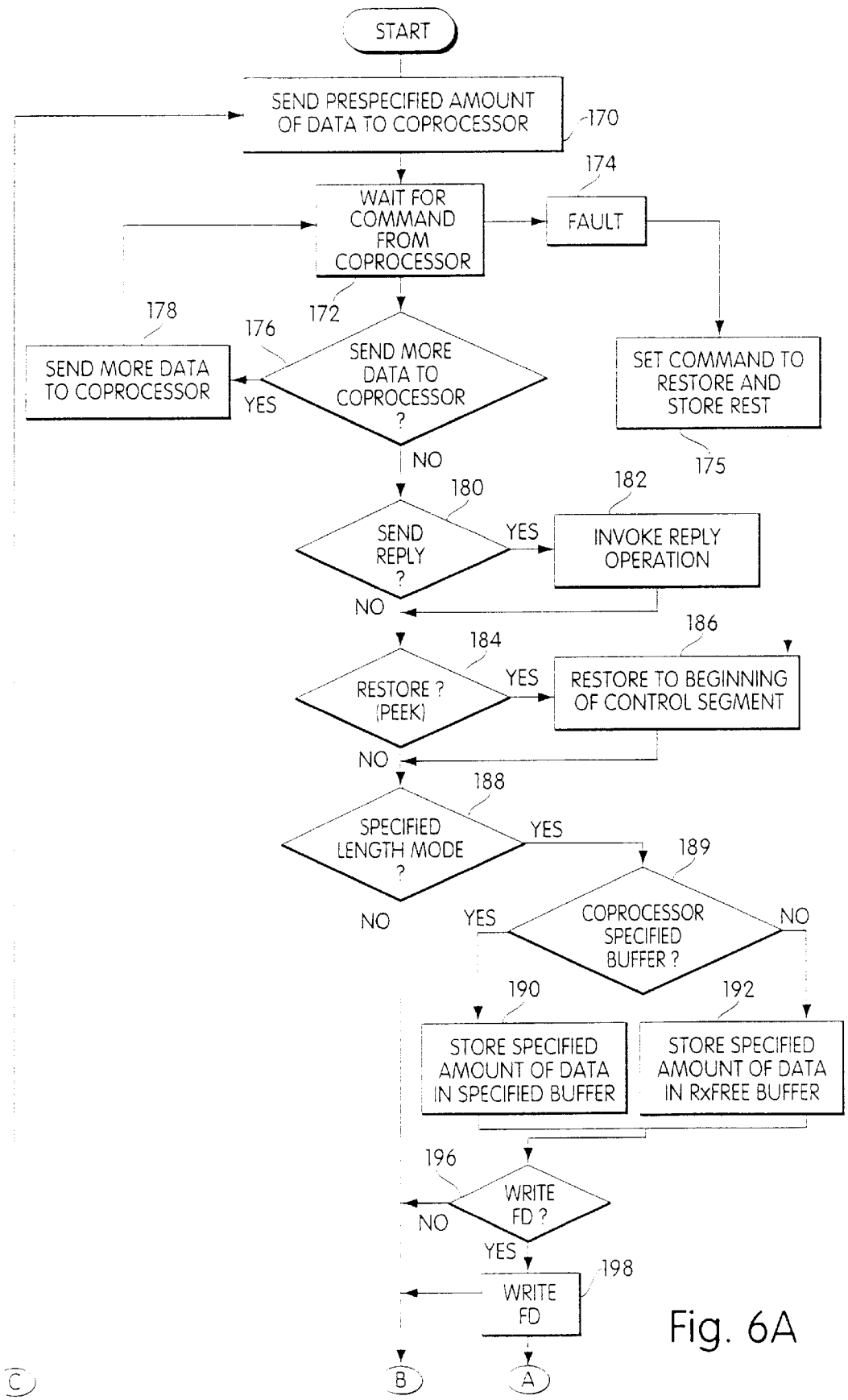
FIGS. 6A and 6B are a flowchart describing message processing on the receive side in accordance with this invention.
Figure 6B:
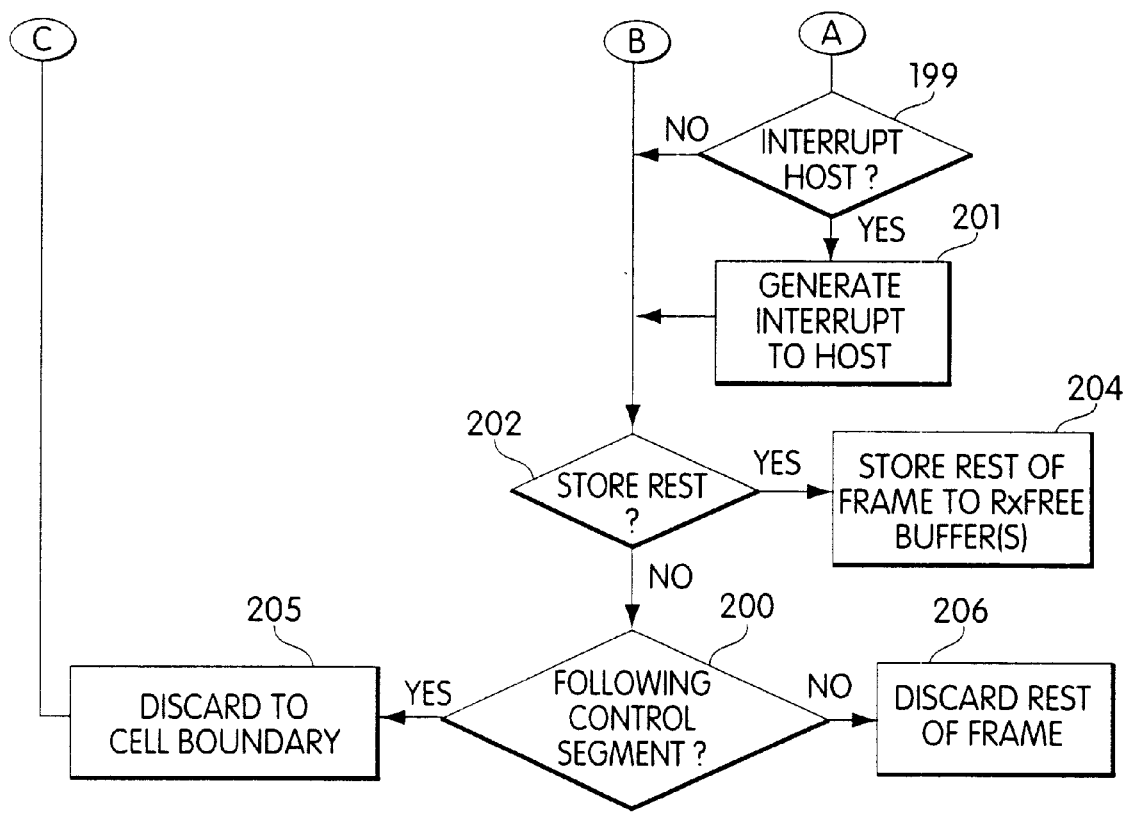

The process for the interaction between the network interface and the receive side message coprocessor 64 will now be described in connection with FIGS. 6A–6B. First, the network interface determines whether a received message is for a specially-marked virtual channel. If so, then the process of FIGS. 6A–6B begins with step 170 of the network interface writing a prespecified amount of data, as indicated in the RX VC table, to the message coprocessor 64. The network interface instructs the message coprocessor to process the information and waits in step 172 for a command to be returned. It may merely wait a specified number of local bus cycles and read a specified memory location in the memory-mapped interface for the command. This command is then interpreted by the network interface. The command word is formatted to indicate the command and any necessary arguments for the commands and thus contains two or more fields: one for the command name and one or more for arguments. If the command indicates a fault (step 174), the message processing operation is undone by a restore operation in step 175, and the message is treated as a normal message. If the command is a request to send more information to the coprocessor, as determined in step 176, more data is sent to the coprocessor in step 178 and the network interface waits again instep 172. Steps 176 and 178 allows for variable lengths of control information for a given connection.

Processing continues with step 180 determining whether the command is a "send reply" command. This command invokes a remote reply operation in step 182, to send a message to another computer, which is described in more detail below in connection with FIGS. 8 and 9.

If the operation is a restore operation, as determined in step 184, the data read from the input message is pushed back onto the message, in processing buffer 158, in step 186. Processing continues with steps 188 through 200 which involve writing a specified amount of data from the message to either a region of memory at a specified address (step 190) or a free buffer form the free buffer list RXfree (step 192), as determined in step 189. If the processing of the message is complete or if the command from the message processor indicates that the rest of the message is to be discarded, as determined in step 196, then a frame descriptor is written into the RXdone queue in step 198. After the frame descriptor is written, if the command from the message coprocessor indicates that an interrupt should be generated to the host processor (as determined in step 199), such an interrupt is generated in step 201. If message data remains, and if this remaining data should be stored, as determined in step 202, the message is stored in a free buffer from RXfree in step 204. Finally, if the message has a following control segment, as determined in step 200, data to the end of the current control segment is discarded in step 205 and processing resumes with the next control segment of the message and step 170. Otherwise, the data is discarded in step 206 and processing terminates.

Having now described receive side processing, the transmit side of message processing support in the network interface will now be described in more detail in connection with FIGS. 7–10.

Figure 7:
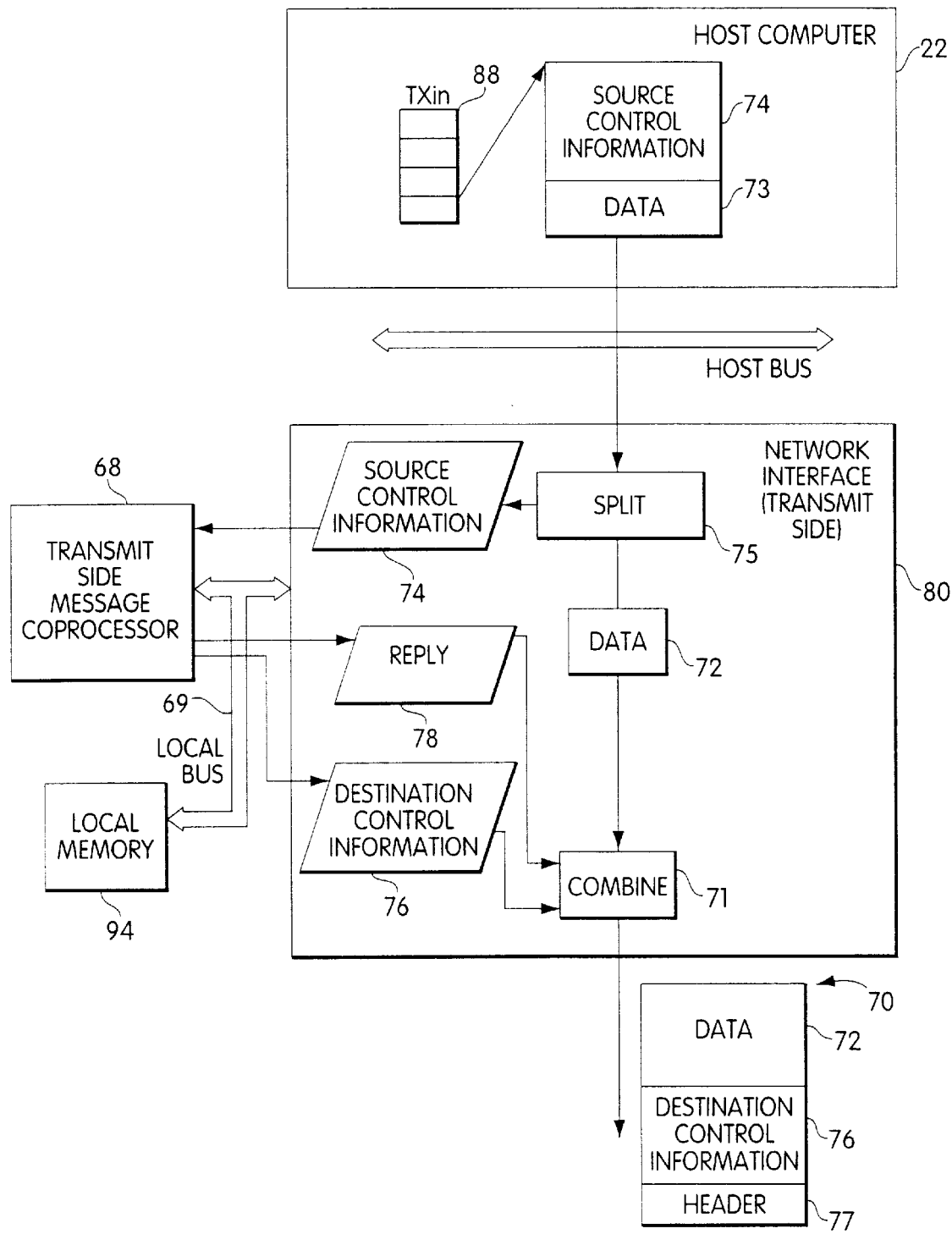
FIG. 7 is a schematic diagram of data flow on a transmit side of a network interface with message processing support in accordance with this invention.

FIG. 7 shows schematically the interaction and data flow through the host computer, network interface and transmit side message coprocessor 68. In transmission, the host computer generates a message containing source control information 74 and optionally data 73. The source control information, described in more detail below, indicates either the destination control information to be inserted in the outgoing message, where it is located or how to generate it. When the message is sent to the network interface, the network interface separates the source control information 74 from the data 73, as indicated at 75, to process the source control information. The source control information 74 is sent to the transmit side message coprocessor 68 which returns a reply 78. The reply may be a command to the network interface, either including the destination control information 76 for the outgoing message, or indicating the location of the destination control information 76 or indicating how to generate the destination control information 76. The destination control information is then combined, as indicated at 71, with data 72, coming either from data 73 or as otherwise specified by the reply command 78, into an outgoing message 70.

Figure 8A:
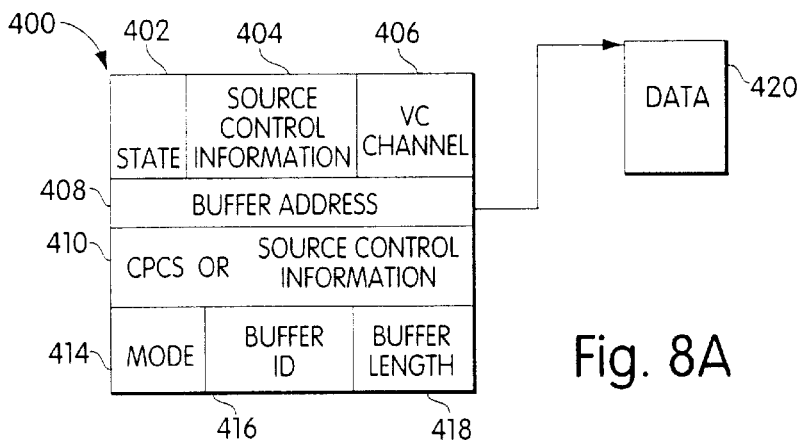
FIG. 8A illustrates a frame descriptor defining source control information.

The form of the source control information 74 will now be discussed in connection with FIGS. 8A–8B. The source control information generally is derived from a frame descriptor in the TXin queue. The frame descriptor, and thus the source control information, may be in a number of different formats. In one embodiment of the invention, as shown in FIG. 8A, a frame descriptor 400 has four lines of four bytes each of data. In the first line, the first byte 402 is state information, the second byte 404 is used for source control information in short command mode described below. The next two bytes 406 are for the VC channel number. The next line 408 is a buffer address or data pointer as referred to below. The third line 410 is either four bytes of additional source control information in short command mode, or otherwise is the CPCS trailer information for ATM AAL5. The last line includes one byte 414 of mode information, one byte 416 for a buffer identifier and two bytes 418 indicating buffer length.

The network interface may maintain a table entry for each virtual channel indicating what form of source control information to expect, or the frame descriptor may indicate the form of the source control information.

The simplest way to encode the source control information is to encode it directly in the frame descriptor as shown in FIG. 8A using fields 404 and 410. The frame descriptor 400 may also include a pointer to the data 420 to be sent in field 408. With this "short command" format, the size of the source control information is limited by the size of the frame descriptor. However, this format is good for low latency since the source control information and frame descriptor can be conveyed to the network interface with one memory operation.

Figure 8B:
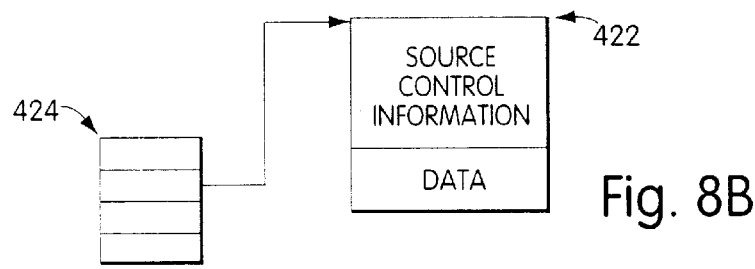
FIG. 8B illustrates a more complex encoding of source control information in a frame descriptor.
Figure 8C:
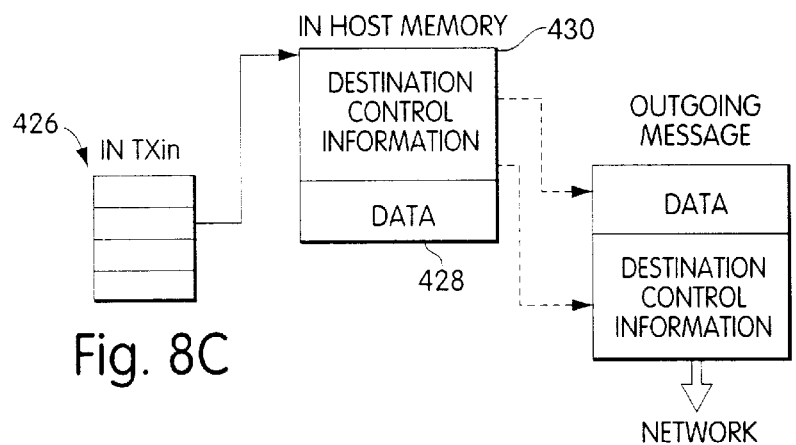
FIG. 8C illustrates a frame descriptor with no source control information.

For larger source control information, the direct encoding of the source control information is replaced, as in the frame descriptor 424 in FIG. 8B, by a reference or pointer in the field 408 to a location in host memory 422 which contains source control information. In either of these embodiments, the source control information is data to be sent to the transmit side message coprocessor as a command.

FIGS. 8C–8H show the range of possibilities for forming outgoing messages. In the form shown in FIG. 8C, the frame descriptor 426 contains no source control information. The data 430 to be sent, indicated using field 408, already includes destination control information 428 at the appropriate location. This mode is the normal mode used when the transmit side for a virtual channel does not support message processing, but where the destination does.

Figure 8D:
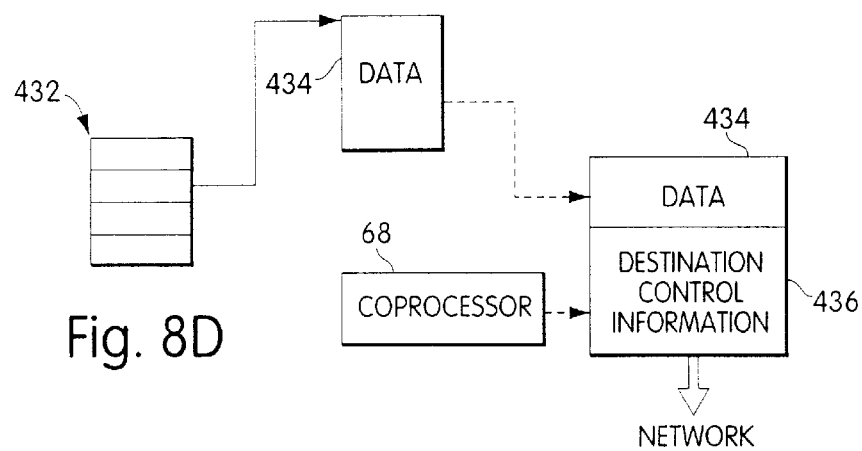
FIG. 8D shows another frame descriptor containing directly encoded source control information.

In FIG. 8D the frame descriptor 432 contains the source control information encoded directly in the frame descriptor using field 410, as in FIG. 8A, and a pointer to data 434 in field 408. The network interface prepends destination control information 436 generated by the transmit side message coprocessor 68 to the data pointed to by the frame descriptor to generate the outgoing message.

Figure 8E:
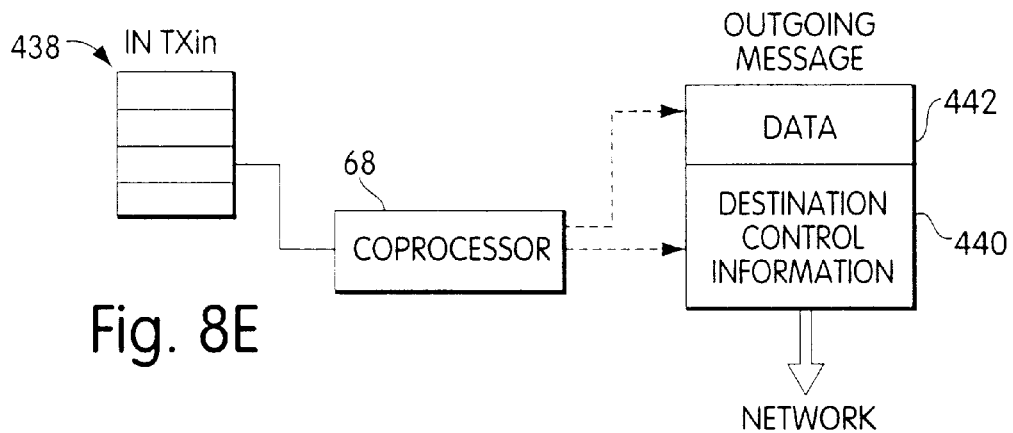
FIG. 8F illustrates a frame descriptor containing a field referring to a location containing source control information.
FIG. 8G illustrates a frame descriptor containing source control information from which the location of the data is computed.
FIG. 8H illustrates a frame descriptor describing a linked list of buffers.

In FIG. 8E, the frame descriptor 438 contains the source control information encoded directly in the frame descriptor using field 410, as in FIG. 8A, and a unused data pointer. The transmit side message coprocessor 68 computes both the location of destination control information 440 and the location in host memory from which the data 442 should be taken.

Figure 8F:
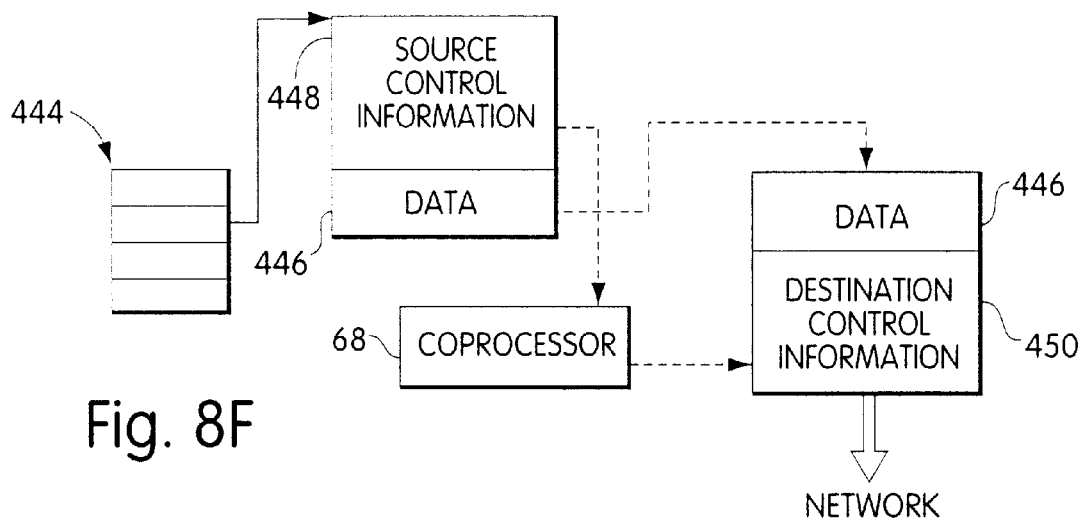
Figure 8G:
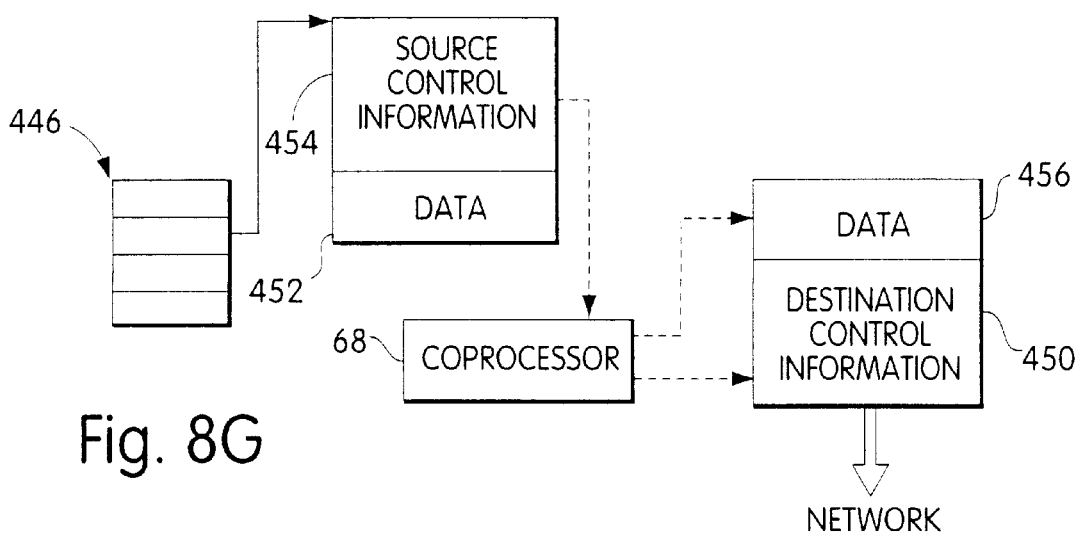
Figure 8H:
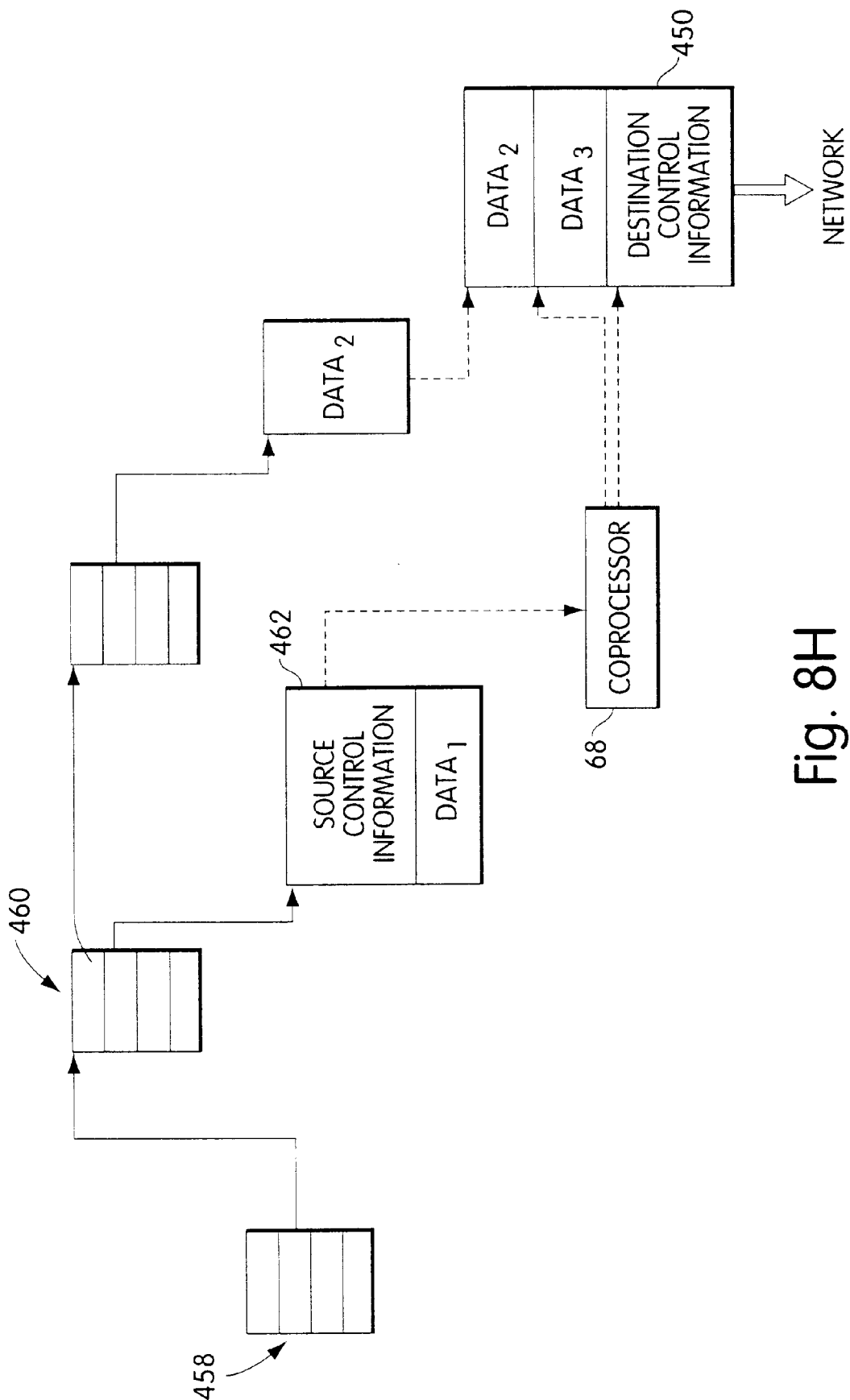

In FIGS. 8F through 8H, similar to FIG. 8B, the source control information is not embedded in the frame descriptor; instead, the frame descriptor data pointer indicates the location of source control information, as in FIG. 8B. In the frame descriptor 444 shown in FIG. 8F, the data 446 to be sent follows the source control information 448 at a location referred to using field 408. The transmit message side coprocessor 68 also generates destination control information 450.

In FIG. 8G, using a frame descriptor 447, any data 452 following the source control information 454 is ignored and the location of the data 456 to be sent is instead computed by the transmit side message coprocessor 68 based on information supplied in the source control information 454. The transmit side message coprocessor 68 also generates destination control information 450.

Finally, in FIG. 8H, the frame descriptor 458 describes a linked list of buffers 460. The first part of the first buffer is interpreted as source control information 462. The transmit side message coprocessor 68 computes the location of the destination control information 460 and the location of data 464 to be sent based on the source control information 462 supplied. Once this coprocessor-specified data is sent, the network interface ignores the remaining data in the first buffer in the linked list and sends data from the second and further data buffers in the linked list.

Figure 9:
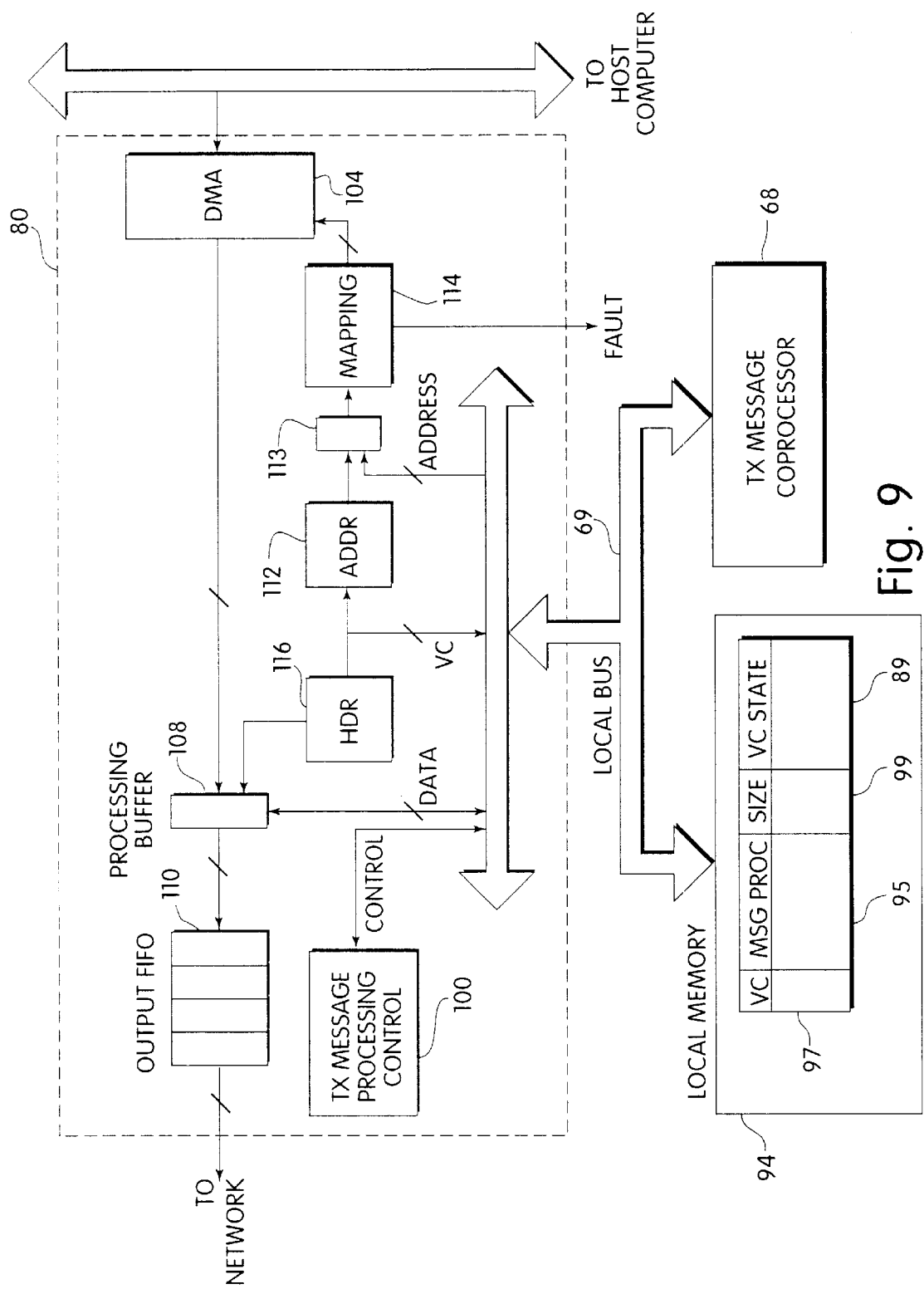
FIG. 9 is a block diagram of a transmit side of a network interface with message processing support in accordance with this invention.

FIG. 9 is a block diagram of elements of the network interface relevant to transmit side message processing. In FIG. 9, a message processing controller 100 controls message processing by the network interface. Local bus 69, connects to a transmit side message coprocessor 68 and possibly a local memory 94 including a transmit side virtual channel (TX VC) table 97. The TX VC table includes, for each virtual channel, an indication 95 of whether the virtual channel is specially-marked for message processing, and if so, an indication 99 of the size of the source control information to send to the transmit side message coprocessor. The TX VC table 97 may also include an indication (not shown) of whether the virtual channel uses a frame descriptor which encodes directly the source control information. As indicated the TX VC table 97 also contains other VC state information 89.

The general operation of the transmit side will now be described. The transmit side 80 of the network interface has the general task of prepending the destination control information 76 onto an outgoing message 70. Although the simplest way to append the destination control information 76 to a message is to allow a host computer to perform this function as in FIG. 8C, this way generally requires more host computer involvement and thus overhead in communication. To allow the transmit side 80 to determine and prepend the destination control information to an outgoing message, the host computer enqueues on the TXin queue a frame descriptor containing source control information for the message coprocessor and optionally some message data. The frame descriptor may be in any of the formats shown in FIGS. 8C–8H, but not limited thereto. The network interface first dequeues a frame descriptor from the TXin queue at an appropriate time. The frame descriptor is used first to determine the virtual channel to which it corresponds and to generate the header using the header processing circuit 116. For a normal message not requiring message processing operations, the network interface processes the message as described above in connection with FIGS. 1A to 1C. If the virtual channel is specially-marked, however, the network interface then identifies the location of the source control information using the frame descriptor or reads the source control information directly from the frame descriptor. The network interface then sends the source control information 74 to the transmit side message coprocessor 68 to perform the indicated processing. The transmit side message coprocessor in turn uses the source control information 74 to determine the destination control information 76, and the location of the data to append to the destination control information in the transmitted message at a location in the message specified by the TX VC table 97. The destination control information may either come from the source control information written to the transmit side message coprocessor or from arbitrary processing performed by the transmit side message coprocessor, e.g. from registers in the coprocessor, and is inserted in the outgoing message in the processing buffer 108. The message data may either comes from the remainder of the originally enqueued message or from an address supplied by the transmit side message coprocessor. The address may be processed by the address generation module 112, mapping module 114 and DMA module 104 to access the data which is then appended to the message in the processing buffer 108.

The interface between the transmit side of the network interface and the transmit side message coprocessor 68 in one embodiment will now be described in more detail. On the transmit side 80, the network interface communicates with the message coprocessor 68 via memory mapped regions over the local bus 69. The number of regions used may vary with the implementation; however, the interface generally requires at least two regions—one to send source control information to the message coprocessor, called a source control region, and another to read a reply. The source control region may include a request region which receives a start instruction and other information, such as VC number or state information. The reply region is used by the message coprocessor to communicate a command and associated arguments, such as destination control information or an address, to the network interface.

In operation, the network interface writes appropriate data, i.e., the source control information, to the source control region, and then writes a start instruction. The message coprocessor processes the source control information which results in one of a small set of commands being written into the reply region along with destination control information, an address or other arguments.

The transmit side of the network interface has a small set of commands which it recognizes from the message coprocessor to simplify the interface. These commands correspond to simple operations to be performed by the network interface, such as the following:

1. compose a message of data read from the message coprocessor;
2. compose a message of data read from the message;
3. compose a message of data read from a specified address, e.g., in host memory;
4. compose a message of data read from both message coprocessor and either the message or a specified address;
5. write a specified amount of data to the message coprocessor and read back another command; and
6. a fault has occurred in the message coprocessor.

It should be understood that this list of commands is merely exemplary and is not limiting. The command structure is generally a number of bytes of data, in which one portion indicates a command and one or more additional portions represent arguments. For example, one byte of data may represent a command. A second byte may represent an argument. Additional bytes may also be used for additional arguments. The command simply indicates which of the small number of commands to perform.

One embodiment of the structure of the source control region and the reply region is shown in Appendix B. This command structure provides great flexibility. The destination control information size can vary per message by sending a fixed amount of data to the message coprocessor which can then request more data representing control information. The coprocessor can either obtain the source control information from the first part of the message of TXin or from other fields in the frame descriptor in TXin. The destination control information can either come from the coprocessor or the message in TXin. Finally, the transmitted message data can either come from the remaining data in the message in TXin or from an address provided by the coprocessor. Each entry in TXin may cause multiple control segments (including destination control information and data) to occur in the transmitted message.

With this interface, the message coprocessor does almost all the processing, and the kind of processing to be performed is programmable and completely up to the user. The network interface merely writes data to the message coprocessor, reads back information which it interprets as a small set of simple commands.

Figure 10:
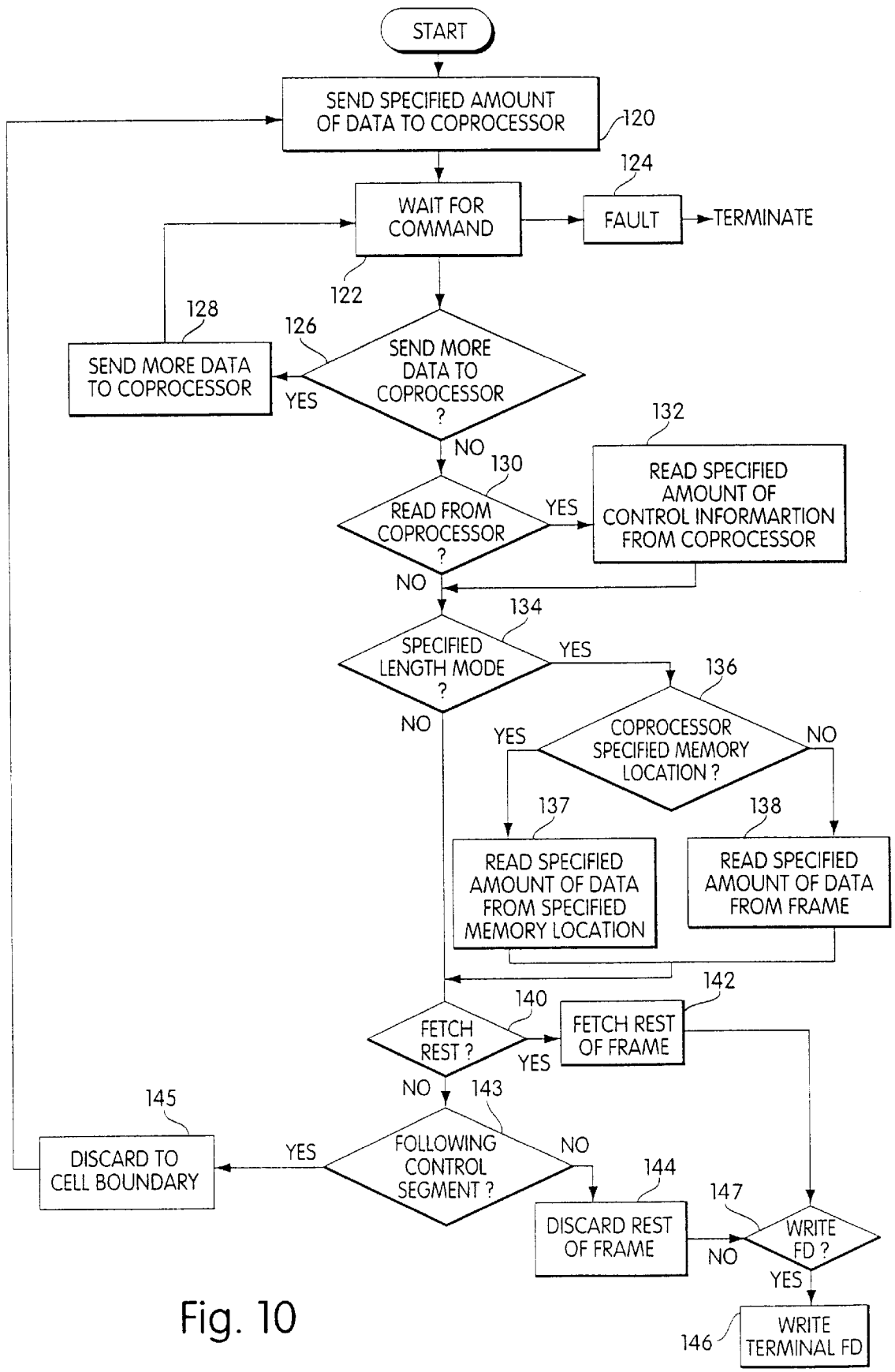
FIG. 10 is a flowchart describing message processing on the transmit side in accordance with this invention.

The process of the interaction of the network interface with the message coprocessor will now be described in more detail in connection with FIG. 10. First, the network interface retrieves the virtual channel information of the next message from the TXin queue to access the TX VC table 97. If the virtual channel is specially-marked for message processing, the process of FIG. 10 is performed.

In step 120, the network interface writes source control information to the message coprocessor via the source control region in the memory mapped interface. If the message does not have the specified amount of control data, an error occurs and the message processing operation is terminated or exception handling procedures are performed. The network interface then instructs the message processor to perform any required processing. The network interface then waits (step 122) a certain number of local memory bus cycles, if necessary, and then reads the command word written by the message coprocessor in the reply region of the memory mapped interface. The network interface then intreprets the command word. The command word is formatted to indicate the command and any necessary arguments for the commands and thus contains two or more fields: one for the command name and one or more for arguments. If the command indicates a fault (step 124) then processing terminates. If the command is a request to send more information to the coprocessor, as determined in step 126, more data is sent to the coprocessor in step 128 and the network interface waits again in step 122. If the command indicates a request to read data from the coprocessor, as determined in step 130, a specifie amount of data is read from the reply region of the memory mapped interface in step 132 and is used to form part of the output message.

Processing continues with step 134 determining whether a specified amount of data is to be read from another location, such as the message or from a specified address of an alternate buffer in host memory. The specified amount of data is then read from the appropriate source in steps 136, 137 or 138 and formed into the output message. If the rest of the message is to be used for the output message, as determined in step 140, that data is so formed into the output message in step 142. Otherwise, if another control segment begins (step 143), the remainder of the control segment being processed is discarded in step 145 and the next control segment in the message is processed starting with step 120. If there is no following control segment, the remainder of the message is discarded in step 144. Finally, if necesary, a frame descriptor is written in the TXdone queue in steps 147 and 146.

Figure 11:
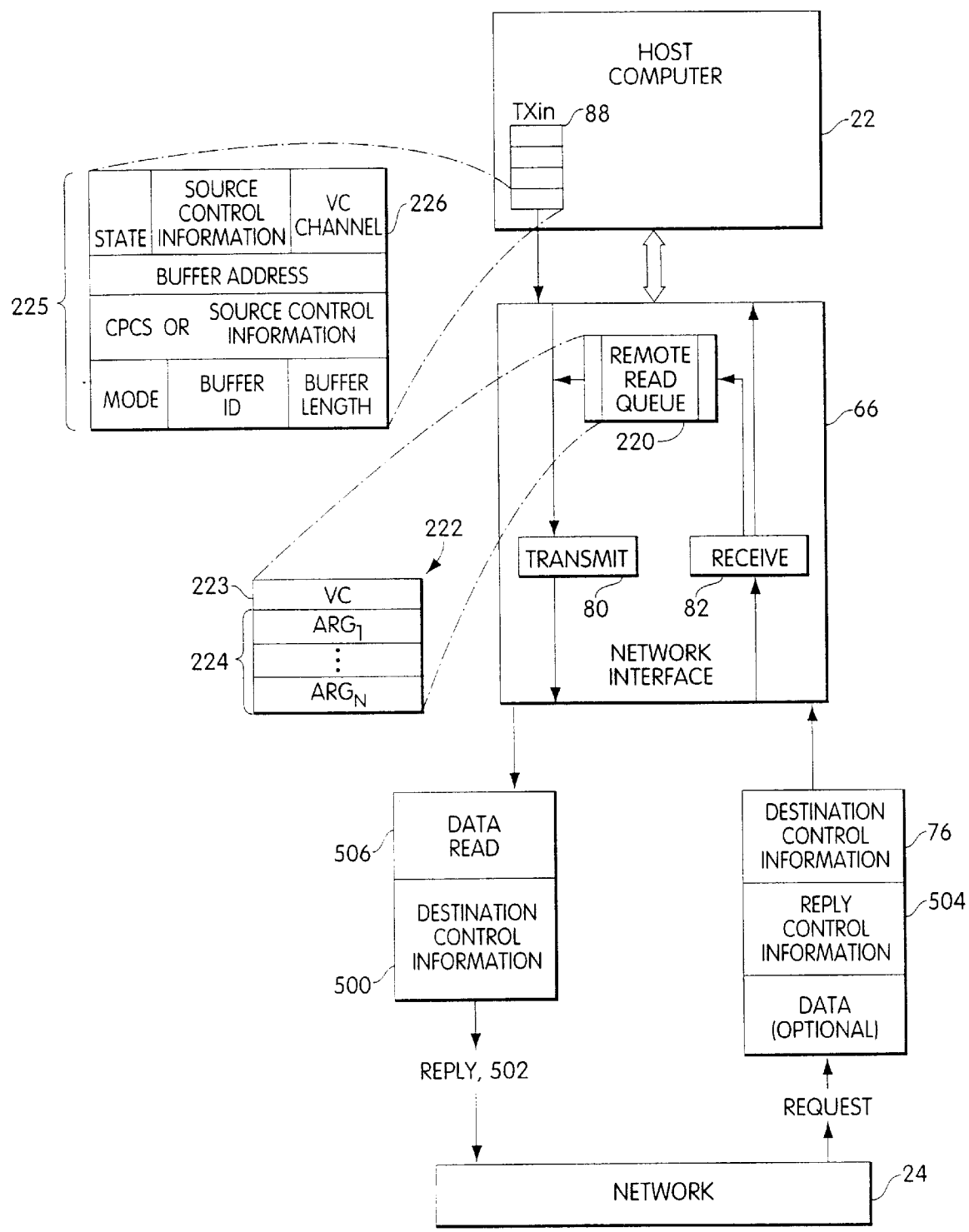
FIG. 11 is a block diagram showing support for remote operations with reply in a network interface in accordance with this invention.

The use of this system to perform remote operations with a reply, such as a remote read operation, will now be described in connection with FIGS. 11 and 12 which illustrate one embodiment of this apsect of the invention. Remote operations consist of write and read operations. Remote write operations, without host intervention, are supported by the architecture described above. For a remote write operation, destination control information in the message is decoded to determine a location in the host memory in which to write the data in the message. Remote reads are intrinsically more difficult to support since the received message must not only be decoded like a remote write, but a send operation must be initiated on the receiving end to provide the reply to the original sender. Nevertheless it is important to also support remote reads, since few applications perform only write operations. Other operations may also cause a form of reply message to be sent to the original sender, which involve steps similar to performing a remote read. The following description is provided using remote reads as an example. However, the kinds of operations which can be supported are any which cause a reply to be sent to the original sender.

Remote reads are supported by breaking a remote read into three parts. The first part is processing of a command, a remote write, at the destination. The remote write command may also contain the read command, address, size, and reply location and address. The second part is interpretation of the command by the host. The third part is initiation of a return remote write containing the reply to the requested read operation. Unfortunately, this implementation of a remote read operation places the host computer in the critical path to interpret the read command, which results in unacceptable latency in response to the read request and host loading. For example, in the systems shown in FIGS. 1A–1C and FIG. 2A, the host would have to process an incoming message, then generate an entry in the transmit queue, and then wait for that entry to be processed by the network interface. Consequently, this implementation is a solution of last resort.

In the present invention, the network interface has support which allows remote read operations to bypass the host. Referring now to FIG. 11, this support includes a remote read queue 220 placed between the receive side 82 and the transmit side 80 of the network interface. The remote read queue may be as small as a single element queue or a FIFO. An element 222 in the remote read queue 220 includes an indication 223 of the virtual channel to which it pertains and arguments 224. In one embodiment, the format of the remote read queue element 222 is identical (aside from some state bits in the first few bytes) to that of the frame descriptors 225 in the TXin queue 88. Alternatively, the remote read queue entry 220 may include a number of arguments which are different in form from the frame descriptor 225. In both the frame descriptor 225 and the remote read queue entry 224, the first few bytes includes an indicator of the virtual channel as shown at 223 and 226.

The network interface processes incoming remote read operations in the following manner. Initially, the network interface processes a remote read the same as a remote write. That is, the receive side writes a specified amount of the message data, i.e., the destination control information 76, to the receive side message coprocessor and then reads a command. Normally, this command from the receive side message coprocessor is performed by the receive side 82. However, if the command is a "send reply" command, the network interface invokes the same mechanism used by the transmit side 80 to prepend some control information to data accessed from a host memory location via DMA.

Figure 12:
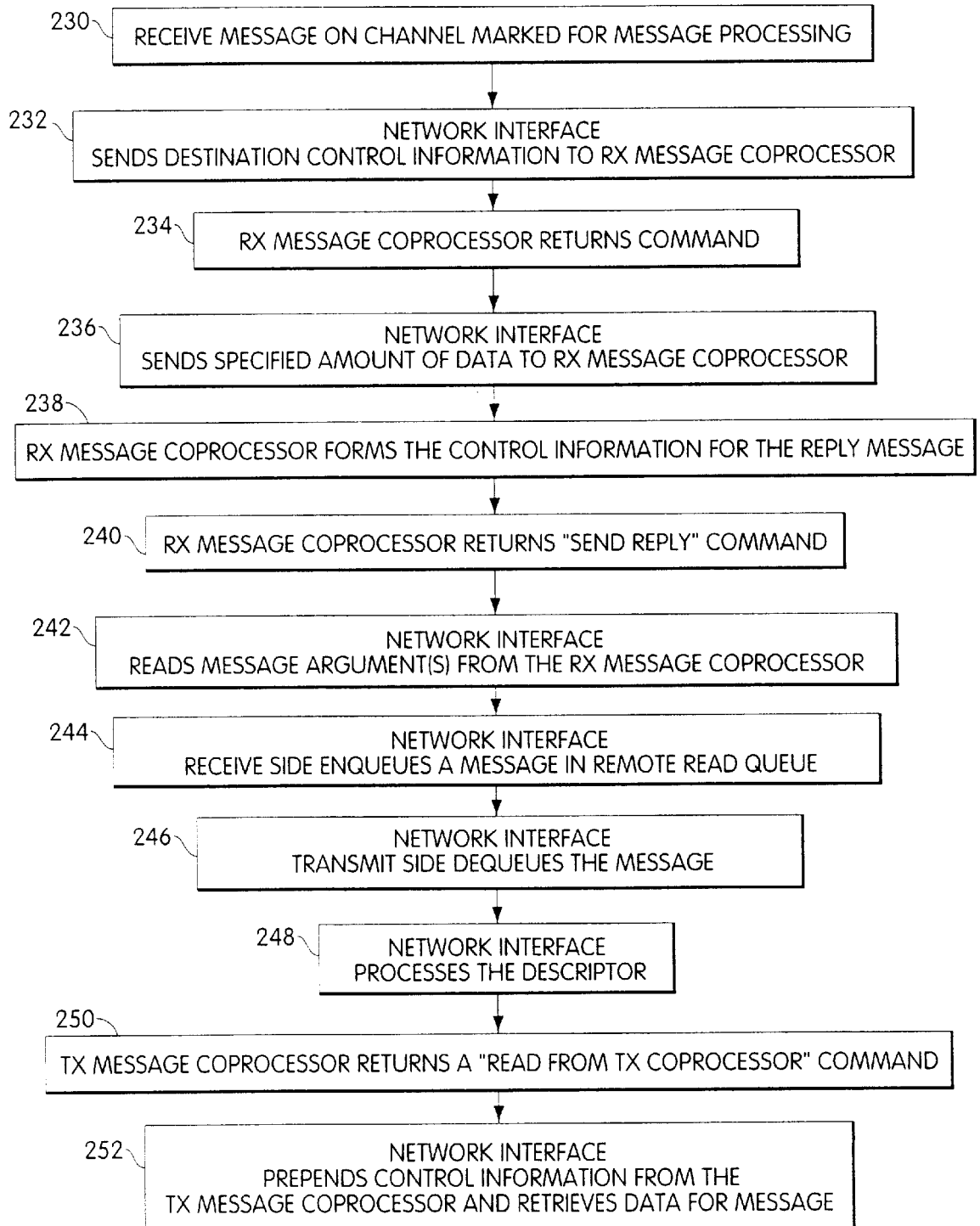
FIG. 12 is a flowchart describing the processing of a remote operation with reply.

FIG. 12 describes in more detail the operations for a particular embodiment which supports remote read operations. Other embodiments are possible. In particular, a system such as shown in FIG. 3 may be modified to include a remote read queue 220. In this embodiment, described in FIG. 12, a message is received on a connection marked for message processing (step 230). As for other operations on the receive side 82, the network interface then sends in step 232 a prespecified amount of destination control information to message coprocessor. This destination control information identifies the message as remote read quest and gives the address and size of the read. Referring for a moment to FIG. 11, the destination control information may also include some reply control information 504 to assist in generating destination control information 500 in the reply message 502. Referring to FIG. 12, the message coprocessor, in step 234, returns a command indicating that the network interface should send more data from the received message. The network interface then sends the requested amount of data, the reply control information 504, to message coprocessor to interpret as the reply location and address (step 236). In step 238, the message coprocessor forms the destination control information 500 for the reply message and stores it away in a memory location to be retrieved later. The message coprocessor returns "send reply" command to the network interface in step 240.

When the network interface detects a "send reply" command, it reads one or more message arguments from one or more additional data fields in the command region of the memory mapped interface (step 242). Such arguments include data which the transmit side will use to generate destination control information and the source for the data for the outgoing message. The receive side 82 of the network interface, in step 244, enqueues in the remote read queue 220 a message indicating both the virtual channel and the message arguments, which the transmit side 80 will later process. By using the remote read queue 220, the receive side 80 of the network interface can avoid writing an entry to host memory in the TXin queue. Depending on the implementation of the remote read queue, the enqueued data may be a single word or multiple data words.

The transmit side periodically polls the remote read queue and, at some time (step 246), the transmit side 80 dequeues the entry from the remote read queue 220. The transmit side uses the data in the remote read queue to obtain data that it would otherwise obtain from a frame descriptor. Because the transmit side can process frame descriptors which include the source control information, without requiring access to the host computer to obtain this information, the receive side should generate such source control information in the remote read queue. Otherwise, the transmit side must perform special handling of data in the remote read queue. In one embodiment, as shown in FIG. 11, the remote read queue elements have exactly the same format as frame descriptors in TXin, so the transmit side may process read queue elements just like TXin entries. In particular, the indicated connection may or may not be specially marked.

If not specially marked, the transmit side processes in step 248 the read queue element just like a frame descriptor from TXin describing a buffer to transmit. If the connection is specially marked, the transmit side initiates message processing, storing the arguments from a read queue element to the transmit side message coprocessor as source control information.

The transmit side message coprocessor in step 250 returns any appropriate command, such as a "read from coprocessor" command to read the destination control information and "read from external address" command to DMA the data from the host memory. The network interface then pushes the previously saved destination control information 500 read from the message coprocessor into the front of the message and then initiates a DMA from the given location in host memory for the read reply data (step 252). Thus, a message containing the requested data 506 and control information for use by the requestor is sent to the requestor.

An embodiment of the control information and reply command structure for the message coprocessor interface to support remote replies is shown in Appendix C.

This implementation of remote read operations exploits both the receive and transmit side message processing support. Contention for access to the transmit side message coprocessor is handled by the network interface by waiting until the appropriate time to process the reply message.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims. For example, there are of course a wide variety of implementations of the support in the network interface for message processing. For example, direct hardware execution using sequential and combinational logic, microprogrammed state machines using sequential logic, and microprocessor cores may be used to implement the transmit and receive sides. The kind of interface between the network interface and the message coprocessor may also take a variety of forms. For example, a bus interface may be provided which allows the message coprocessor to communicate actively with the network interface. Alternatively a passive interface such as the described memory mapped interface may be used. It should also be understood that the protocol for exchange of information can also take a variety of forms.

What is claimed is:

1. A network interface, for connecting a host computer to a computer network interconnecting a plurality of computers, wherein each of the plurality of computers and the host computer has a separate memory and operating system, and having support for performing remote operations from one of the plurality of computers requiring a reply from the host computer, the network interface comprising:

a receive side for processing incoming messages and for identifying an incoming message from one of the plurality of computers requesting a remote operation;

a reply queue for storing an entry indicating a connection with the one of the plurality of computers and a location of data in the memory of the host computer to be transmitted to the one of the plurality of computers requesting the remote operation;

wherein the receive side places an entry in the reply queue in response to an incoming message identified as requesting a remote operation while bypassing the operating system of the host computer; and a transmit side for processing outputting messages and for reading the entry from the reply queue, including means for accessing the location in the memory of the host computer to retrieve data while bypassing the operating system of the host computer and means for generating header information using the indicated connection to generate a reply message to the one of the plurality of computers.

2. The network interface of claim 1, wherein the receive side, the transmit side and the reply queue are implemented in an integrated circuit.

3. The network interface of claim 1, further comprising a message coprocessor connected to the receive side, wherein the receive side of the network interface comprises:

means, in the network interface, for receiving a message containing data and destination control information which indicates an operation to be performed on the message data;

means, in the network interface, for extracting destination control information from the received message and for communicating extracted destination control information to the message coprocessor;

means, in the network interface and operative after communication of the extracted control information to the message coprocessor, for receiving a command and arguments generated by the message processor and means for performing at least one of a small set of operations on the received message according to the received command and arguments.

4. The network interface of claim 3, wherein the message indicates an operation requiring a reply and wherein the command generated by the message coprocessor is a command instructing the receive side to place the entry in the reply queue.

5. The network interface of claim 1, further comprising a message coprocessor connected to the transmit side, wherein the transmit side of the network interface comprises:

means, in the network interface, for receiving source control information from the host computer, wherein the source control information indicates how destination control information is obtained for an outgoing message, and for communicating the source control information to the message coprocessor;

means, in the network interface and operative after communication of source control information to the message coprocessor, for receiving a command and arguments generated by the message coprocessor in response to the source control information;

means, for performing at least one of a small set of commands according to the received command and arguments to obtain the destination control information indicating an operation to be performed on the outgoing message by a recipient of the outgoing message; and means, in the network interface, for inserting the destination control information in the outputting message to be transmitted over the network to at least one of the plurality of computers.

6. The network interface of claim 5, further comprising, in the host computer, a transmit queue having entries indicating the source control information, and wherein a format of entries in the transmit queue is identical to a format of entries in the reply queue.

7. A method, performed by a network interface connecting a host computer to computer network interconnecting a plurality of computers, wherein each of the plurality of computers and the host computer has a separate memory and operating system, and for processing a message received from one of the plurality of computers and including a request to perform an operation requiring a reply from the host computer, comprising the steps, performed by the network interface and independently of the host computer, of:

receiving the message and extracting the request;

processing the request;

generating a transmit request to transmit a message providing the reply and placing the transmit request in a reply queue in the network interface while bypassing the operating system of the host computer;

polling the reply queue in the network interface to identify transmit requests; and processing any identified transmit requests to generate the message providing the reply while bypassing the operating system of the host computer.

8. The method of claim 7, further comprising the steps of:

receiving a message containing data and destination control information which indicates an operation to be performed on the message data;

extracting destination control information from the received message and for communicating extracted destination control information to a message coprocessor;

receiving a command and arguments generated by the message processor; and performing at least one of a small set of operations on the received message according to the received command and arguments.

9. The method of claim 8, wherein the message indicates an operation requiring a reply wherein the command generated by the message coprocessor is a command instructing a receive side of the network interface to perform the steps of generating and placing the entry in the reply queue.

10. The method of claim 7, further comprising the steps of:

receiving source control information from the host computer, wherein the source control information indicates how destination control information is obtained for an outgoing message;

communicating the source control information to a message coprocessor connected to a transmit side of the network interface;

receiving a command and arguments generated by the message coprocessor in response to the source control information;

performing at least one of a small set of commands according to the received command and arguments to obtain the destination control information indicating an operation to be performed on the outgoing message by a recipient of the outgoing message; and inserting the destination control information in the outgoing message to be transmitted over the network to at least one of the plurality of computers.

11. The method of claim 10, wherein a host computer includes a transmit queue having entries indicating the source control information, and wherein a format of entries in the transmit queue is identical to a format of entries in the reply queue.

12. A network interface, for connecting a host computer to a computer network interconnecting a plurality of computers, wherein each of the plurality of computers and the host computer has a separate memory and operating system, and having support for performing remote operations from one of the plurality of computers requiring a reply from the host computer, the network interface comprising:

a receive side for processing incoming messages and for identifying an incoming message from one of the plurality of computers requesting a remote operation;

a reply queue for storing an entry indicating a connection with the one of the plurality of computers and a location of data in the memory of the host computer to be transmitted to the one of the plurality of computers requesting the remote operation;

wherein the receive side, in response to the incoming message requesting a remote operation, places an entry in the reply queue independently of the host computer while bypassing the operating system of the host computer; and a transmit side for processing outputting messages and for reading the entry from the reply queue, including means for accessing the location in the memory of the host computer independently of the host computer to retrieve data, and means for generating header information independently of the host computer using the indicated connection to generate a reply message to the one of the plurality of computers.

13. The method of claim 7, wherein the transmit request indicates a connection with the one of the plurality of computers and the location of the data in the host computer, and wherein the step of processing includes accessing the location in the host computer to retrieve the data and generating header information using the indicated connection to generate the message providing the reply.

* * * * *